US006526443B1

(12) United States Patent
Goldsmith et al.

(10) Patent No.: US 6,526,443 B1
(45) Date of Patent: Feb. 25, 2003

(54) METHOD AND APPARATUS FOR MANAGING TRANSACTIONS WITH CONNECTED COMPUTERS

(75) Inventors: Steven Y. Goldsmith, Albuquerque, NM (US); Laurence R. Phillips, Corrales, NM (US); Shannon V. Spires, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/310,635

(22) Filed: May 12, 1999

(51) Int. Cl.[7] .............................................. G06F 13/00
(52) U.S. Cl. ........................ 709/224; 709/218; 709/313
(58) Field of Search ........................... 709/1, 100, 101, 709/203, 217, 218, 219, 223, 224, 313

(56) References Cited

U.S. PATENT DOCUMENTS

| 5,869,819 A | * | 2/1999 | Knowles et al. ............. 235/375 |
| 5,892,900 A | * | 4/1999 | Ginter et al. ................ 395/186 |
| 5,910,896 A | * | 6/1999 | Hahn-Carlson ......... 364/479.01 |
| 6,167,378 A | * | 12/2000 | Webber, Jr. ..................... 705/1 |

OTHER PUBLICATIONS

Parker and Icerman, "Stakeholder Identification of Advanced Technology Opportunities at International Ports of Entry," Sandia National Laboratories Technical Report (1996).

Schonemann in "Authenticated Tracking and Monitoring System (ATMS) tracking shipments from an Austalian uranium mine," Institute of Nuclear Materials Management 39th Annual Conference (1998).

Spires, "The DCLOS Distributed Object System," SNL AISL Technical Report, printed May 12, 1999.

Jacobson, "Object–Oriented Sofware Engineering," ACM Press (1992).

Lesser, "A Retrospective View of FA/C Distributed Problem Solving," IEEE Transactions on Systems, Man and Cybernetics 21 (6): 1347–1362 (1992).

Tambe, "Towards Flexible Teamwork," Journal Artificial Intelligence Research 7, 83–124 (1997).

Wooldridge and Jennings, "Intelligent Agents: Theory and Practice," Knowledge Engineering Review 10(2) (1995).

Jennings, "Specification and Implementation of a Belief––Desire Joint Intention Architecture for Collaborative Problem Solving" (1993).

Godfrey, "The State–of–the Art Port of Entry Workshop," Sandia National Laboratories Technical Report, (1995).

* cited by examiner

Primary Examiner—Viet D. Vu
(74) Attorney, Agent, or Firm—Robert D. Watson

(57) ABSTRACT

The present invention provides a method and apparatus that make use of existing computer and communication resources and that reduce the errors and delays common to complex transactions such as international shipping. The present invention comprises an agent-based collaborative work environment that assists geographically distributed commercial and government users in the management of complex transactions such as the transshipment of goods across the U.S.-Mexico border. Software agents can mediate the creation, validation and secure sharing of shipment information and regulatory documentation over the Internet, using the World-Wide Web to interface with human users.

25 Claims, 33 Drawing Sheets

COLLABORATOR/ACTOR'S PHYSICAL ACTIONS

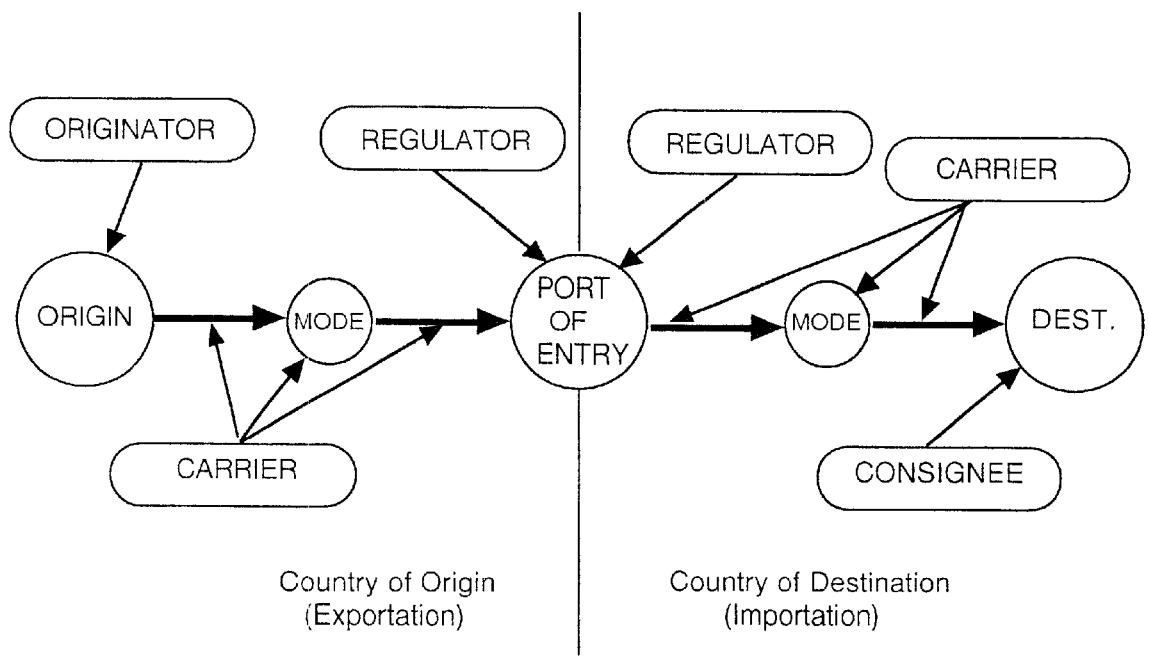

Country of Origin (Exportation) | Country of Destination (Importation)

I. <u>Originator</u>
  Actions: Sequesters cargo; loads container; seals container II. <u>Carrier</u>
  Actions: Allocates conveyance; transports cargo; changes conveyance III. <u>Regulator</u>
  Actions: Identifies conveyance & container; inspects container; releases cargo; impounds cargo; checks seal IV. <u>Consignee</u>
  Actions: Unseals container; unloads cargo; inspects cargo

Fig. 4

COMPONENT FLOWS AMONG ACTORS

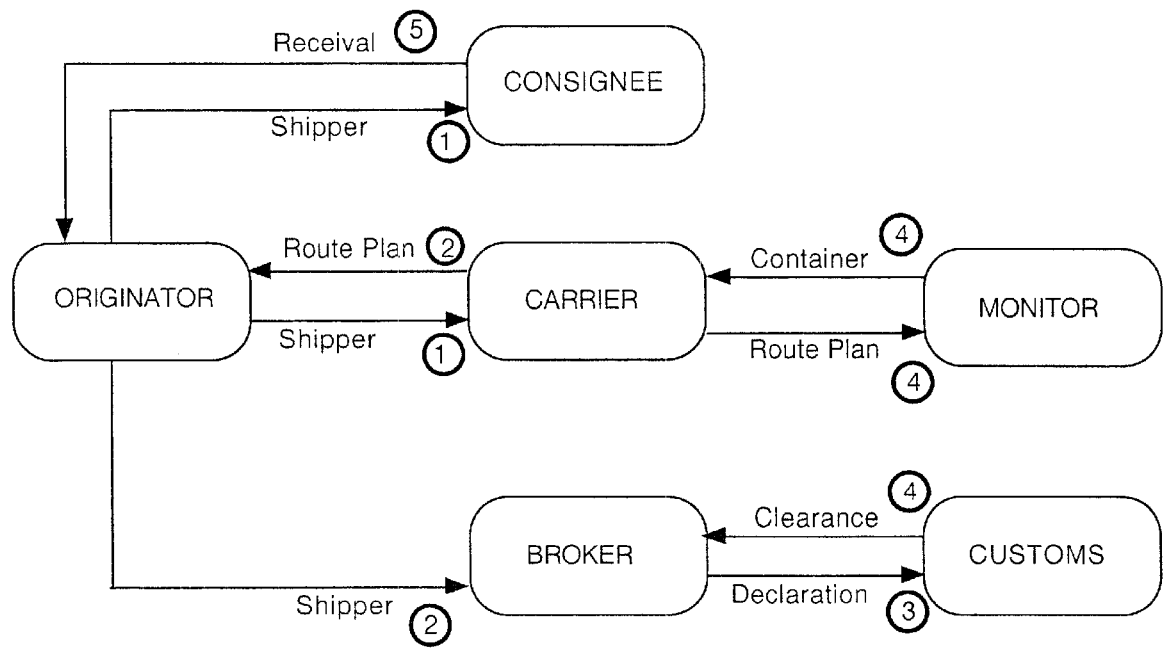

1. The Originator fills out a shipper form that identifies the cargo, destination, timing, and carrier. The shipper is transmitted to the Carrier, and the invoice is transmitted to the Consignee.

2. The Carrier recieves the shipper form and produces a transportation plan describing the route, conveyances, drivers, and a schedule that includes arrival time at the POE and the destination. The transportation plan is transmitted to the Initiator. The Initiator produces a manifest for the broker identifying the cargo and the ETA/POE.

3. The broker produces a declaration that provides Customs with the necessary information.

4. Customs produces a clearance indicating the declaration is acceptable.

5. Consignee produces a recieval document when cargo arrives.

Fig. 5

SCHEMATIC ROUTE MODEL FOR A CONTAINER TRAVERSAL

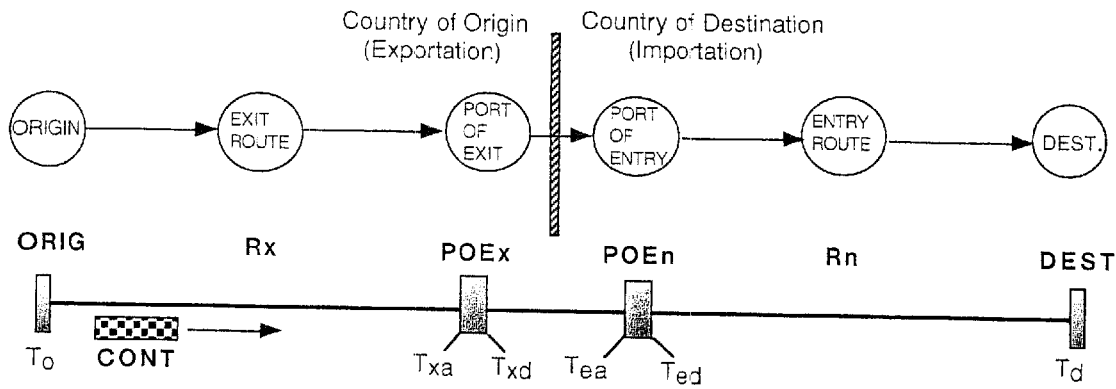

Ontology

Reasoning about the traversal taken by a BTFS container for the purpose of coordinating the information flows to the stakeholders does not require a full geographical description of the routes. The goal is to model only the attributes of the traversal that are necessary to meet the criteria: 1) measure various times along the route to determine system performance; 2) ensure that the declarations are validated by the regulators prior to the arrival of the container at the Port of Exit and Port of Entry; 3) ensure that the cargo arrives at the destination within the specified time interval. The elements of the schema are the Container (CONT), and ROUTE described by a set of ordered pairs:

$$\text{Route} = \{ (x,y) \mid x \sim \text{Place}, y \sim \text{Time}\}$$

where Place is the class of Place objects and Time is the class of Time objects. A Place object is described by:

$$\text{Place: } \{ (lat, lon), \text{place-name}, \text{place-attributes}, \text{place-role}, \text{place-container}\}$$

where (lat,lon) is the latitude-longitude pair, place-name is a well-known geographical designator, place-attributes describe the place (city, truck stop, rail depot, intermodal yard, etc), place-container is the name of the superior geographical object (City, State, Country, Continent), place-role describes the function of the place-object in the traversal instance: origin, destination, POEx, POEn, waypoint, intermodal facility, warehouse, etc. Time points are described by variuos means, but can be statistical distributions, confidence intervals, integer values, etc. The distinguished points are Origin (ORIG), Port of Exit (POEx), Port of Entry (POEn), and Destination (DEST). The intervening route between the Origin and the Port of Exit is an ordered set of place-time points called the Exit Route (Rx). The route between the Port of Entry and the Destination is a set of place-time points called the Entry Route (Rn). The points are ordered as follows:

$$\text{ORIG} < \text{Rx} < \text{POEx} < \text{POEn} < \text{Rn} < \text{DEST}$$

The Exit Route and Entry Route objects contain orderings of place-objects with the role of waypoint, rail segment, road/highway, or intermodal yard that indicate the links traversed along the route. The route objects are necessary to support route adherence checking and ETA algorithms (if required).

Fig. 6

SCHEMATIC ROUTE MODEL FOR A CONTAINER TRAVERSAL (CON'T)

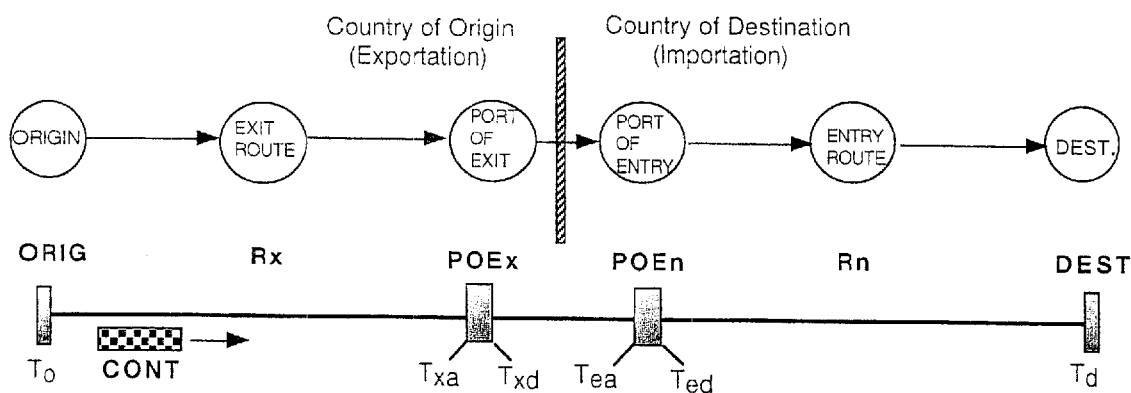

Traversal Script

The container (CONT) leaves the Origin (ORIG) at time $T_o$ and begins the traversal of the Exit Route (Rx). The Exit Route is traversed in the interval $[T_o, T_{xa}]$, arriving at POEx at time $T_{xa}$. The container remains at the POEx over the interval $[T_{xa}, T_{xd}]$. The container exits the POEx at time $T_{xd}$ and enters the frontier. The container enters the POEn at time $T_{ea}$ and remains at the POEn over the interval $[T_{ea}, T_{ed}]$. The container leaves the POEn at time and begins the traversal of the Entry Route (Rn) at time $T_{ed}$. The Entry Route is traversed in the interval $[T_{ed}, T_d]$. The container arrives at the Destination (DEST) at time $T_d$.

Fig. 8

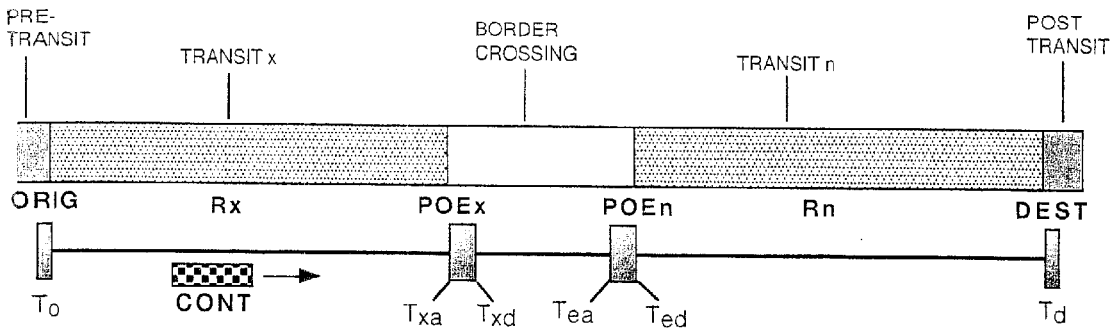

I. Pre-transit State ($t < T_o$)
    Actions:
        1. Originator fills out a shipper form.
        2. Originator sends shipper to the Consignee.
        3. Originator sends shipper form to Carrier.
        4. Originator sends shipper form to Broker.
        5. Carrier sends conveyance/container to Origin.
        6. Originator loads container with cargo.
        7. Originator seals container.
        8. Conveyance leaves Origin.

II. Transit X State ($T_o <= t <= T_{xa}$)
    Actions:
        1. Carrier transports cargo to POEx.
        2. Carrier reports status during transport.
        3. Broker fills out declaration forms for POEx and POEn.
        4. Broker sends declaration form to Regulator at POEx.
        5. Broker sends declaration form to Regulator at POEn.
        6. Regulator at POEx validates declaration form for self-consistency.
        7. Regulator at POEn validates declaration form for self-consistency.

III. Border Crossing State ($T_{xa} <= t <= T_{ed}$)
    Actions:
        1. Carrier presents container (cargo) at POEx.
        2. Regulator at POEx registers container and references declaration.
        3. Regulator at POEn releases cargo.
        4. Carrier presents cargo at POEn.
        5. Regulator at POEn registers container and references declaration.
        6. Regulator at POEn releases cargo.

IV. Transit N State ($T_o <= t <= T_{xa}$)
    Actions:
        1. Carrier transports cargo to Destination.
        2. Carrier reports status during transport.

III. Post Transit State ($t > T_d$)
    Actions:
        1. Consignee unseals container.
        2. Consignee unloads cargo.
        3. Consignee fills out a receival form.

Fig. 9

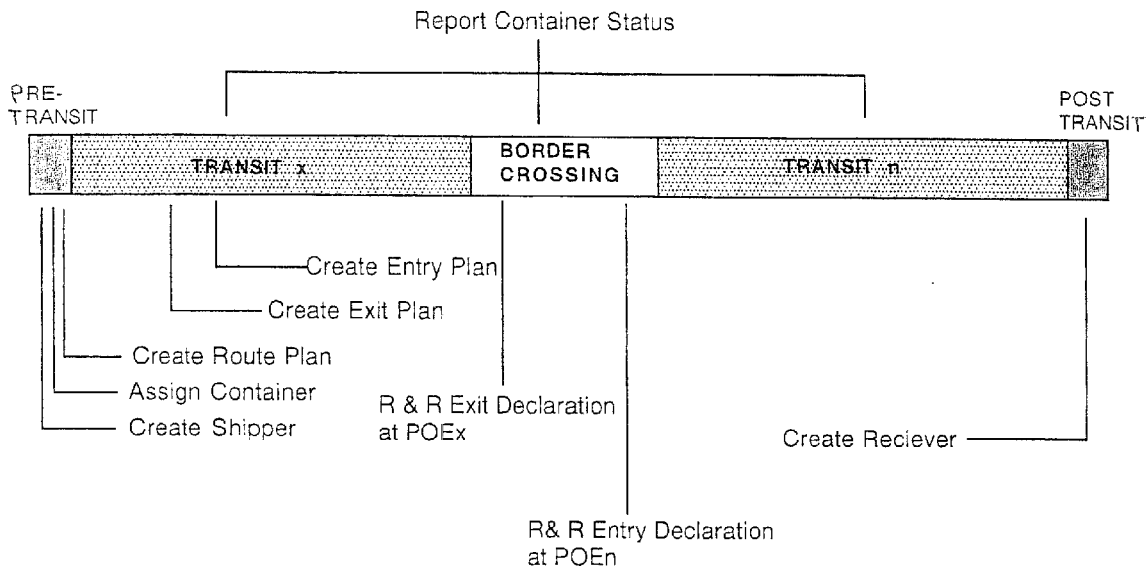

Pre-Transit Functions

1. Create Shipper - A Shipper is a description of the basic attributes of the traversal (who, what, when where, how). It identifies the Originator, Carrier, Consignee, Cargo, Arrival and Departure Times/Dates Origin, Destination, and special requirements. The Shipper attributes are negotiated among the Originator, Consignee, and Carrier.

2. Create Route Plan - A Route Plan identifies the traversal taken by the container from Origin through POEx/POEn to Destination.

3. Asign Container - Based on the route plan, a monitored container is identified, prepped, cryptographically initialized and made available to the Carrier.

Transit n Functions

4. Create Exit Plan - An Exit Plan identifies customshouse broker, POEx, declarations (all documents required by the Entry Regulator, i.e., for USA its USCS, FDA, USDA, etc.), and records actual inspection history for the cargo and container.

5. Create Entry Plan - An Entry Plan identifies customshouse broker, POEn, declarations (all documents required by the Entry Regulator, i.e., for USA its USCS, FDA, USDA, etc.), and records actual inspection history for the cargo and container.

Border Crossing Functions

6. R&R Exit Declaration - The Exit Regulator must Register and Reference the declaration. Registration means unambigiously identify the cargo container in real space at the border chokepoint (with very high surety). Reference means find the declaration data object in information space using the high-confidence identity. Referencing leads to either validation of the documents and release, validation and inspection (delay), or invalidation of the documents and inspection (delay).

Fig. 10

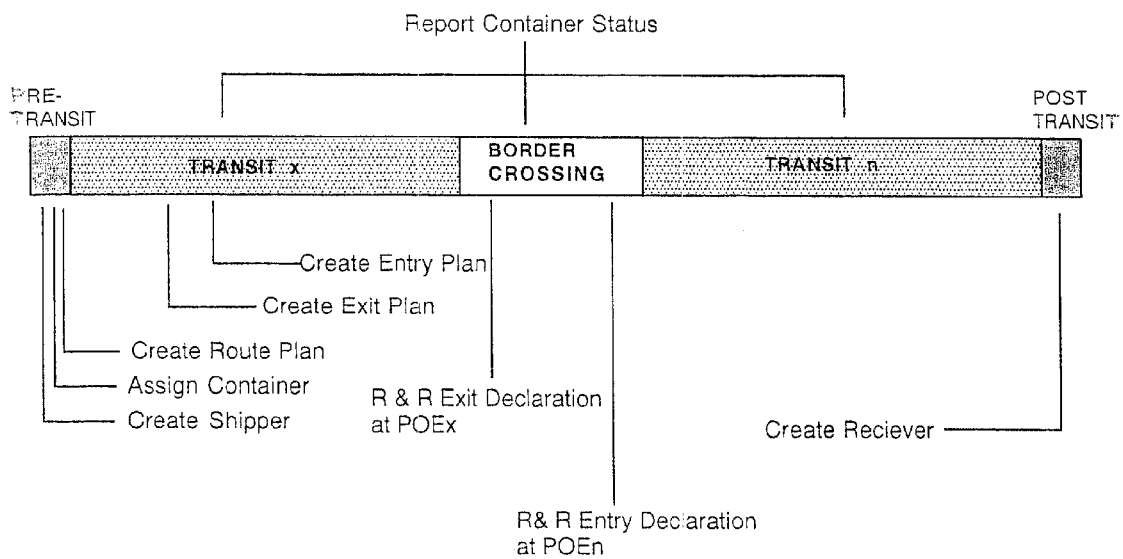

Border Crossing Functions (con't)

7. R&R Entry Declaration - Same class of process as the R&R Exit Declaration.

Transit n Functions

8. Report Container Status (also in Transit n and Border Crossing states) - Container location, surety status, SOH and other real-time information are reported.

Post Transit Functions

9. Create Reciever - A Reciever reports the status of the cargo, arrival time, problems and customer issues. It also server to close out the transaction.

Fig. 11

DATA COMPONENT TRADING FOR A SHIPMENT TRANSACTION

COLLABORATOR-ACTORS OPERATE ON COMPONENTS OF THE SHARED SHIPMENT TRANSACTION OBJECT

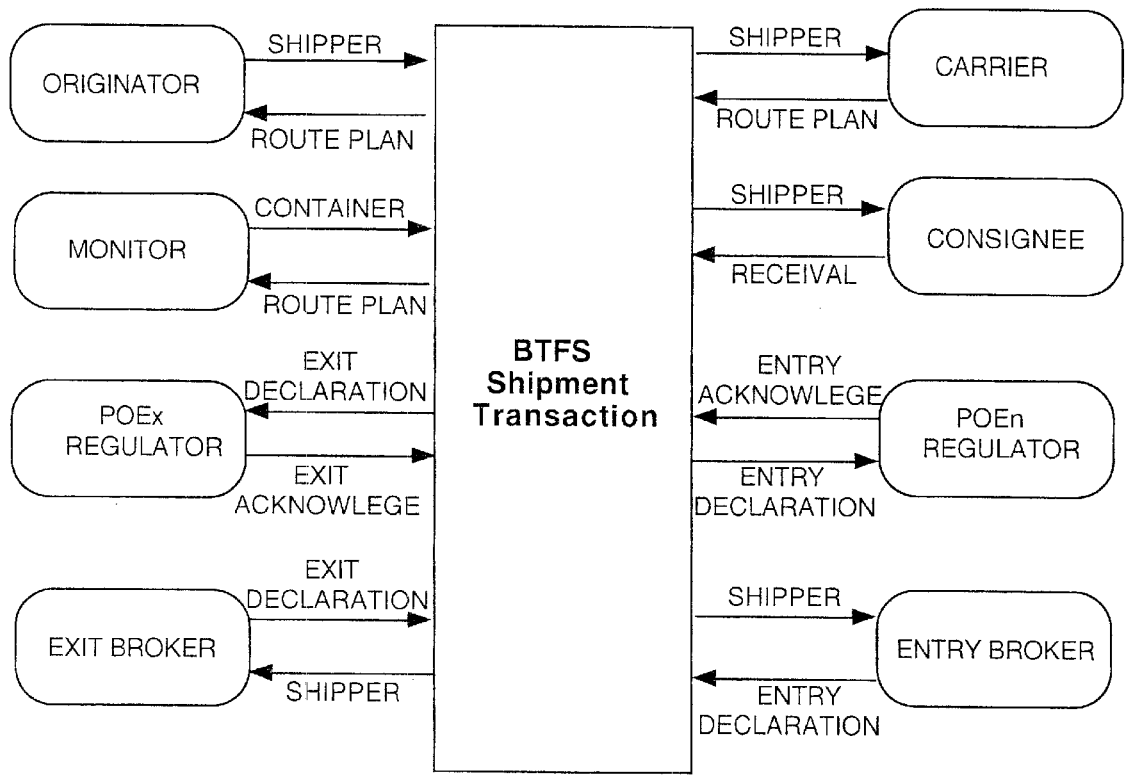

The BTFS Shipment Transaction (ST) is the supremal object (superobject) that is the subject of the collaborative operations. Each collaborator performs its value-added processing on one or more component objects of the ST. Each collaborator modifies the state of the superobject, moving it towards a "goal state".

Fig. 13

( document 1.0 )<sup>A</sup>
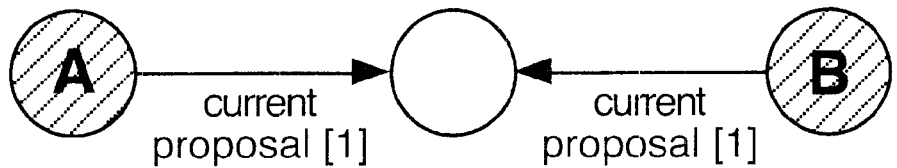
How about this?
( document 1.1 )<sup>B</sup>
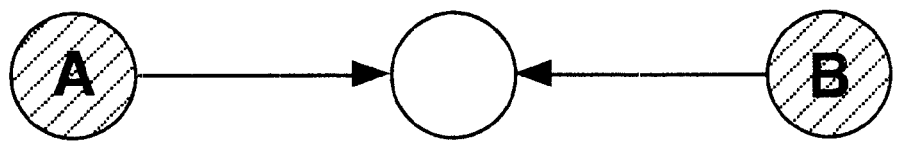
*Change not acceptable; alteration suggested*
( document 1.2 )<sup>A</sup>
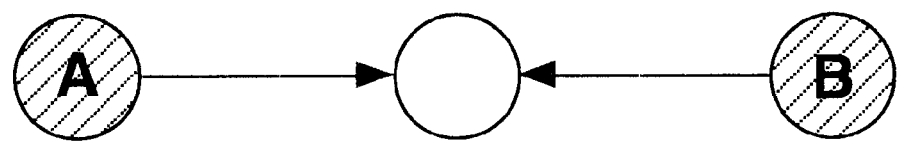
*Alteration accepted; additional change proposed*
( ( document 1.2 )<sup>A</sup> )<sup>B</sup>
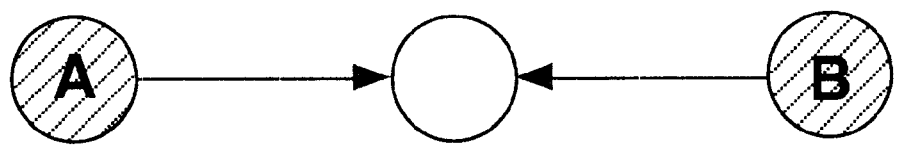
*All changes accepted*
Fig. 27

Border Trade Facilitation System (BTFS) Storyboard

1. Sign on to BTFS; opening screen
2. Initiate transaction for shipment
3. Contact transport firm; arrange for transportation
4. Fill out required forms (a)
5. Fill out required forms (b)
6. Initiate verified transaction; inspect open transactions

---

1. Sign on to BTFS; opening screen

2. Initiate transaction for shipment

Fig. 30B

3. Contact transport firm; arrange for transportation

Fig. 30C

4. Fill out required forms (a)

Fig. 30D

5. Fill out required forms (b)

Fig. 30E

6. Initiate verified transaction; inspect open transactions

METHOD AND APPARATUS FOR MANAGING TRANSACTIONS WITH CONNECTED COMPUTERS

This invention was made with Government support under Contract DE-AC04-94AL85000 awarded by the U.S. Department of Energy. The Government has certain rights in the invention.

BACKGROUND OF THE INVENTION

This invention relates to the field of using connected computers to securely initiate, modify, monitor, and report complex long-duration business transactions, specifically business transactions such as international shipping.

Managing complex transactions can be a complex, paper-based, error prone process. The complexity, amount of paper, propensity for error, and associated costs can increase with the complexity of the transaction. These characteristics are especially apparent in international shipping, where complexity, time delays, and regulatory requirements can lead to significant costs.

For example, each day several thousand commercial trucks cross the U.S.-Mexico border at six major ports of entry along the U.S./Mexico border. Many carry cargo to and from the maquilas in Mexico. A maquila, or "twin plant," typically provides inexpensive labor for the assembly of parts or subassemblies into finished goods that are then re-shipped to the U.S. for consumption. Passage of the North American Free Trade Agreement (NAFTA) has increased maquila traffic at ports of entry along the southwestern U.S. border significantly since 1993. Maquila border crossings are projected to be in the thousands daily by the year 2000. Ironically, the increased border traffic has provided drug smugglers with a crowded street in which to disappear, creating a tension among US government agencies responsible for the facilitation of trade and the interdiction of drugs. The governments of the United States and Mexico currently have projects under way or planned that will expand the physical capacity of existing ports of entry. The U.S. recently opened a new port at Santa Teresa, N.Mex. Plans to increase the capacity for handling information necessary to document the increasing number of border crossings have not been made, largely because the majority of the information handling resides in the commercial sector.

A significant fraction of commercial trucks currently arrive at ports of entry with either incorrect or incomplete documentation. These trucks are summarily pulled over to a primary inspection area, and sometimes subsequently to a secondary inspection area, where they are often completely unloaded. Primary and secondary inspections take a minimum of 15 minutes and can last several hours or even days if problems are found. Delays typically cost both the transport provider and the manufacturer. Truck and driver costs can exceed $100/hour. Maquila plants are increasingly operated in just-in-time mode, so receival delays at the maquilas can result in work stoppage, idling dozens of workers and halting production lines costing thousands of dollars per minute to run. Paper documents currently carry the information needed to cross the border. Truck drivers carry the documents and present them to inspectors at the ports of entry and exit. Many factors can cause delays at the port, including drug interdiction campaigns and fugitive alerts. Proper documentation does not always prevent delays, but improper documentation is virtually certain to cause them.

The root causes of documentation errors are deeply buried in the complex preparations that precede a border crossing. The required regulatory documents for each leg of the trip are numerous and bilingual. Additional NAFTA requirements have further complicated the documentation while increasing the cross-border traffic, leading to the expansion of the import/export brokerage industry in both the US and Mexico. For example, a typical package prepared by a Mexican broker includes the original invoice; the Shipper's Export Declaration; a Spanish language invoice called the factura; an import pedimento (Mexican import/export declaration document); an English manifest and a Spanish manifesto describing the physical nature of the shipment for the trucking firms; a packing list, describing how the shipment is actually arranged on the truck; and any of several possible Mexican regulatory compliance documents. NAFTA documents must be on file certifying the firm as a maquila, and the pedimento must be registered by the firm in some manner to satisfy year-end material-balancing regulations. The driver and the vehicle must be properly licensed and certified. Further complications stem from the maquilas' ability to consolidate several invoices and facturas under a single pedimento. Shipment into the U.S. involves several additional U.S. import documents. The documents are syntactically distinct, although there is significant semantic overlap. For example, the "total shipment value" given on many of these documents is not necessarily called the same thing between any given pair of documents nor will the value necessarily be computed on the same basis. For example, valuations are in two different currencies.

Customshouse brokers assist manufacturers with preparing the documents for a given shipment and generally pay any duty assessed. Brokers also provide additional assurance to their clients by remaining up to date on the latest regulations regarding trade between the U.S. and Mexico. They are essentially brokers of specialized knowledge and information, operating between government regulators and the commercial world. Brokers prepare regulatory forms from an initial manifest that may be presented by a client in a variety of forms, including presentation in person, fax machine, Electronic Data Interchange (EDI), and most recently Internet email. Although segments of the process are computerized, transcription of information from paper to computer and back occurs often even in advanced brokerage houses. Fortunately both the U.S. and Mexican customs services have (separate) computerized entry systems that accept document filings by modem. Nonetheless, errors occur with great regularity and brokers maintain troubleshooters on site at the ports of entry to handle such incidents.

A successful border crossing is the result of a coordinated effort on the part of the manufacturer, the consignee, and carriers and brokers on both sides of the border. FIGS. 1, 2, 3, 4, and 5 illustrate some of the interactions and relationships among the various stakeholders. For example, a nominal southbound (U.S. to Mexico) maquila shipment involves the owner of the goods ("the firm"), the firm's U.S. shipping facility, at least one U.S. trucking company (perhaps owned by the firm), U.S. customs, a U.S. export broker (sometimes an employee of the firm), Mexican customs, a Mexican import broker (also sometimes an employee of the firm), a Mexican trucking company, and finally the maquila plant itself.

Although new port facilities are planned and expansion of old ports has begun, traffic at the border is often backed up several miles. Often the customs district maintains several alternative ports in the same area. However, drivers cannot effectively choose an alternative port prior to enqueing for two reasons: (1) the intended port of entry is declared on the paper document the driver carries and cannot be changed without resubmission to the US Customs Automated Cargo System; and (2) the driver cannot determine the traffic load (nor, therefore, estimate the delay) at the port until arrival.

Border-crossing stakeholders have noted that a frequent cause of legitimate freight being pulled over for inspection is improper or incomplete documentation. In a recent border process survey, 78% of U.S. and Mexican firms doing business across the border cited automated documentation as a priority technology, the highest percentage for any technology in the survey. See Parker and Icerman, "Stakeholder Identification of Advanced Technology Opportunities at International Ports of Entry", Sandia National Laboratories Technical Report (1996). Stakeholders were concerned, however, that a highly-accessible electronic documentation scheme might make their proprietary information vulnerable. Commercial stakeholders were adamant that the system be decentralized; they considered a central database administered by a national government highly undesirable. The second-most frequently cited technology, container/conveyance tracking, was cited by 60%. In all, technologies that the stakeholders identified as high-priority appear to address the root causes of their delays: correct, complete, and timely electronic documentation;

computer-based sharing of shipment information among stakeholders; protection of proprietary information; and timely shipment status information.

Simulations of the new Santa Teresa port of entry show that computerized documentation and tracking technology would cut time spent waiting to cross the border by 33% (from 18 to 12 minutes) at 30% technology penetration and four times the traffic in 1995–96, and by 52% (from 47 to 20 minutes) at 60% penetration and six times the traffic in 1995–96 (saturation level). These reduced waiting times would be enjoyed by all vehicles, not just those with advanced technology. If a dedicated lane for advanced technology vehicles were added in the latter case, those vehicles would enjoy a reduction in waiting time of 75%.

Consequently, there is a need for method and apparatus that make use of existing computer and communication resources and that reduce the errors and delays common to complex transactions such as international shipping.

SUMMARY OF THE INVENTION

The present invention provides a method and apparatus that make use of existing computer and communication resources and that reduce the errors and delays common to complex transactions such as international shipping.

The present invention comprises an agent-based collaborative work environment that assists geographically distributed commercial and government users in the management of complex transactions such as the transshipment of goods across the U.S.-Mexico border. Software agents can mediate the creation, validation and secure sharing of shipment information and regulatory documentation over the Internet, using the World-Wide Web to interface with human users. Agents can be organized into Agencies. Each agency can represent a commercial or government agency. Agents can perform four specific functions on behalf of their user organizations: (1) agents with domain knowledge can elicit commercial and regulatory information from human specialists through forms presented via web browsers; (2) agents can mediate information from forms with diverse ontologies, copying invariant data from one form to another thereby eliminating the need for duplicate data entry; (3) cohorts of distributed agents can coordinate the work flow among the various information providers and they can monitor overall progress of the documentation and the location of the shipment to ensure that all regulatory requirements are met prior to arrival at the border; (4) agents can provide status information to human users and can attempt to influence them when problems are predicted.

The present invention comprises a number of innovations, including a distributed object substrate that supports authenticated transactions among agents, a general-purpose agent development framework, agent integration with the World-Wide Web, and a collaborative agent architecture that supports open trading over the Internet.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES.

The accompanying drawings, which are incorporated into and form part of the specification, illustrate embodiments of the invention and, together with the description, serve to explain the principles of the invention.

FIGS. 1, 2, 3, 4,and 5 are schematic representations of interactions and relationships involved in a border crossing.

FIGS. 6, 7, 8, 9, 10, and 11 are schematic route models of a trans-border shipment.

FIGS. 13 and 14 are illustrations of a complex distributed information structure with compositional semantics.

FIG. 27 is a schematic representation of negotiation.

DETAILED DESCRIPTION OF THE INVENTION

Figure 1:
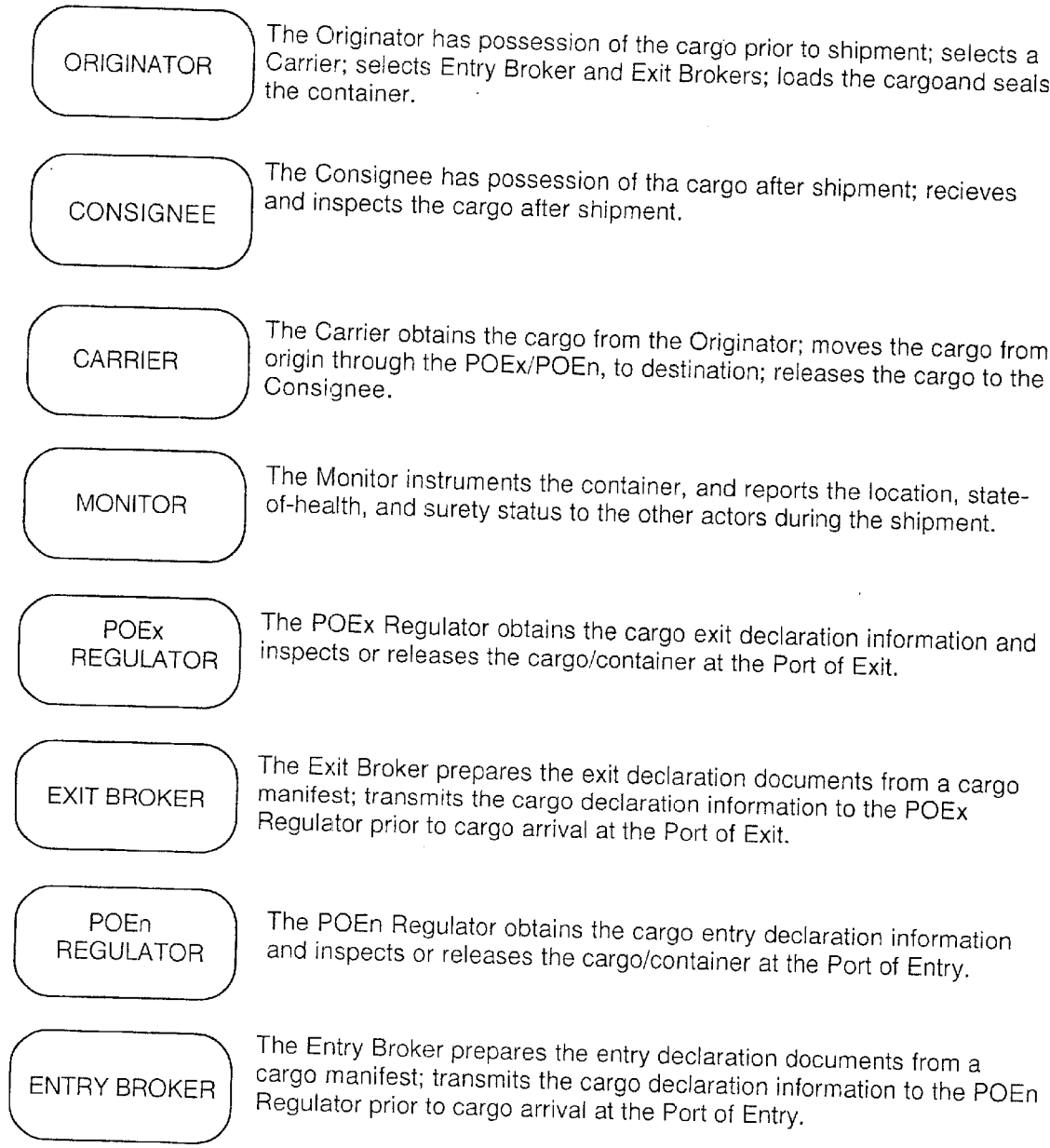
Figure 2:
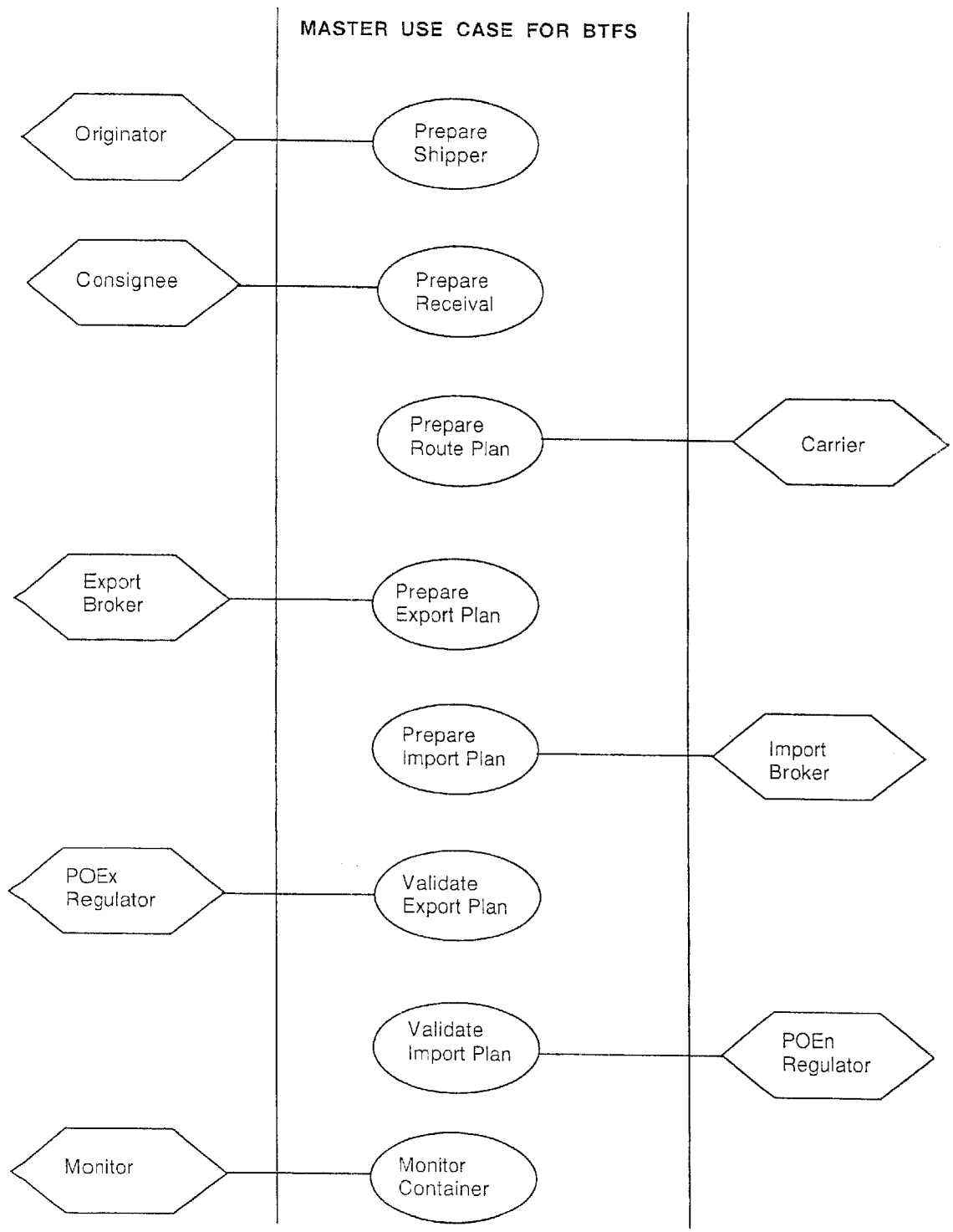
Figure 3:
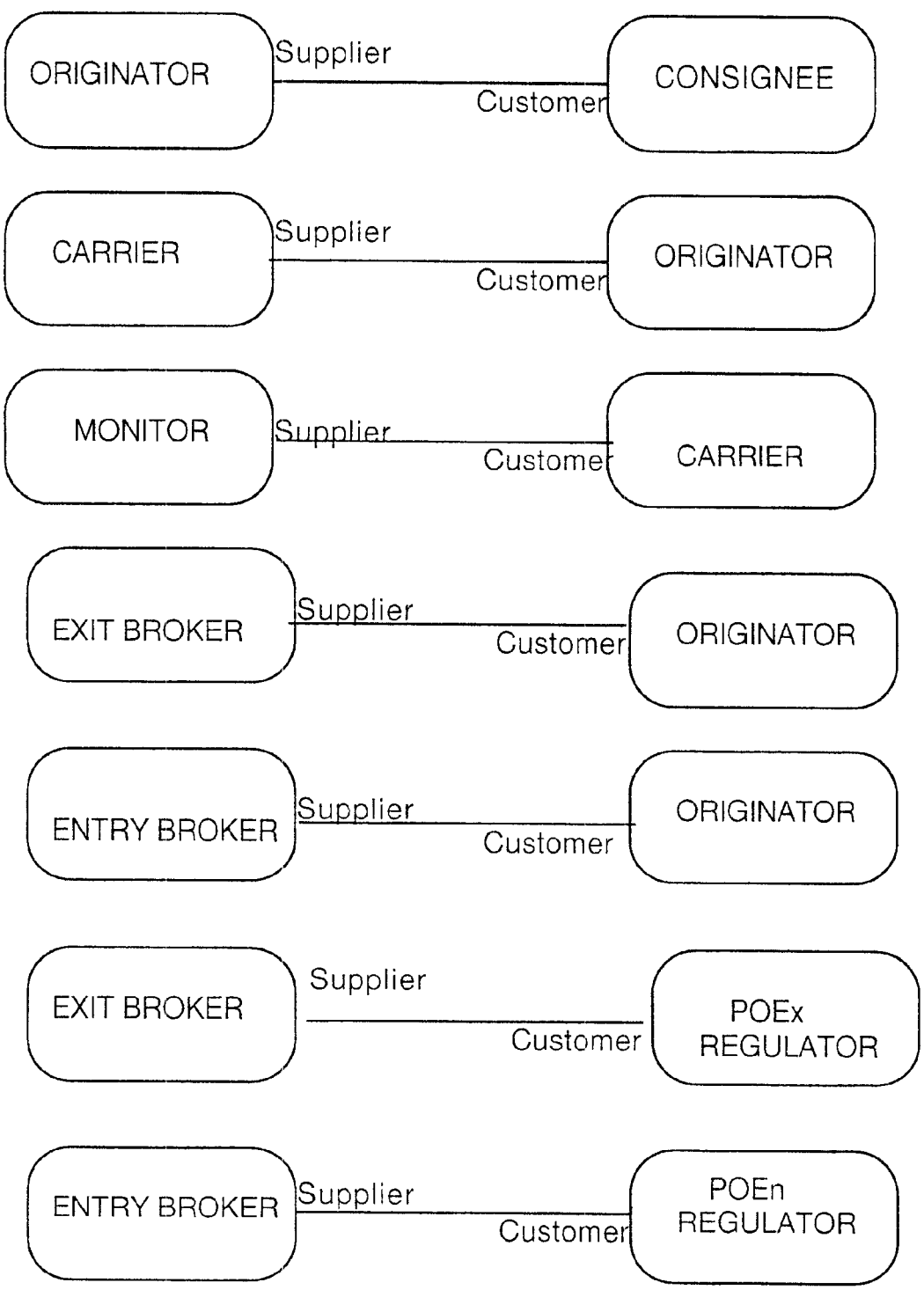
Figure 7:
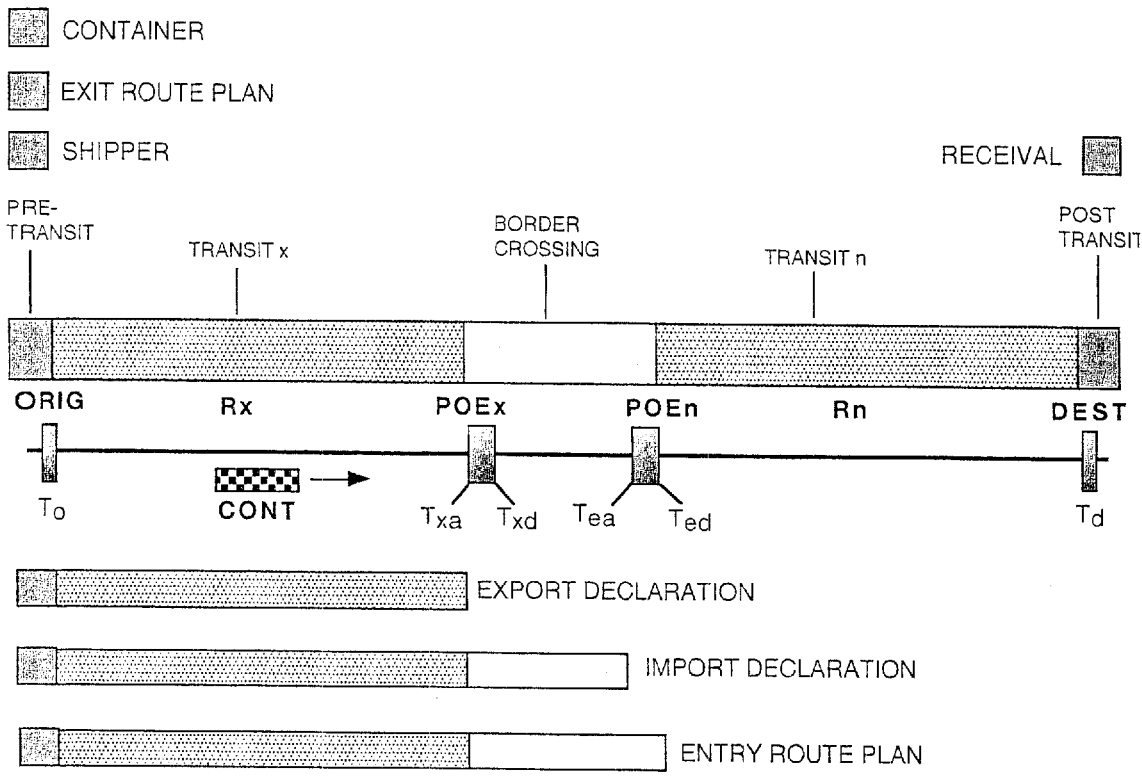

The present invention provides a method and apparatus that make use of existing computer and communication resources and that reduce the errors and delays common to complex transactions such as international shipping.

The present invention represents the physical actions in a transaction and the accompanying certification or documentation as a set of events in information space, the state of which both controls and certifies events in physical space. The description below is set in the context of trans-border shipment of goods; those skilled in the art will appreciate modifications to the description to accommodate various other transactions with similar characteristics. FIGS. 6–11 are schematic route models of a trans-border shipment.

The present invention provides a real-time transaction-centric model of the physical border-crossing process. The present invention comprises a secure electronic commerce system that interfaces with the humans responsible for documenting commercial and regulatory information. The present invention can be practiced in conjunction with a physical sensor system that tracks the actual physical location or status of vehicles or cargo. For example, a tracking system such as that described by Schonemann in "Authenticated Tracking and Monitoring System (ATMS) tracking shipments from an Australian uranium mine", Institute of Nuclear Materials Management 39th Annual Conference (1998), incorporated herein by reference, can be used.

Secure Electronic Commerce System

Coordination of the shipping process to improve the timeliness and correctness of the information requires a collaborative information processing network that spans government and commercial entities, involves both the U.S. and Mexico, and passes Spanish and English-language documents. Security to protect proprietary information is of paramount importance to commercial entities. Security is also critical to government agencies; an insecure system on the open Internet could be used to spoof regulatory agencies at the border and thereby lend support to criminal activities such as drug smuggling.

An objective of a system according to the present invention is to ensure that the U.S. and Mexican Customs databases contain validated documents when a truck arrives at the border. The truck cargo can have a unique ID code that identifies it with its counterpart (representation) in information space. An enforcement officer can use this code to reference the documents and make an inspection decision. The flow of data through the system is transaction-centric; each new shipment instance is a new transaction. A transaction is initiated by the ultimate customer-the manufacturer-either on the shipper side or the consignee side. A transaction may be open for long periods; many days in some cases.

To achieve the level of integration and information quality envisioned by the border stakeholder community, the present invention is based on multi-agent concepts and technology. Software agents can elicit specialized information from human informants, monitor overall progress of the documentation task, monitor the location of the shipment via tracking sensors, coordinate the work flow, and attempt to influence human actors when problems are predicted or detected. Agent functions can be realized by goal-directed agents specializing in various tasks in the import/export domain.

Figure 12:
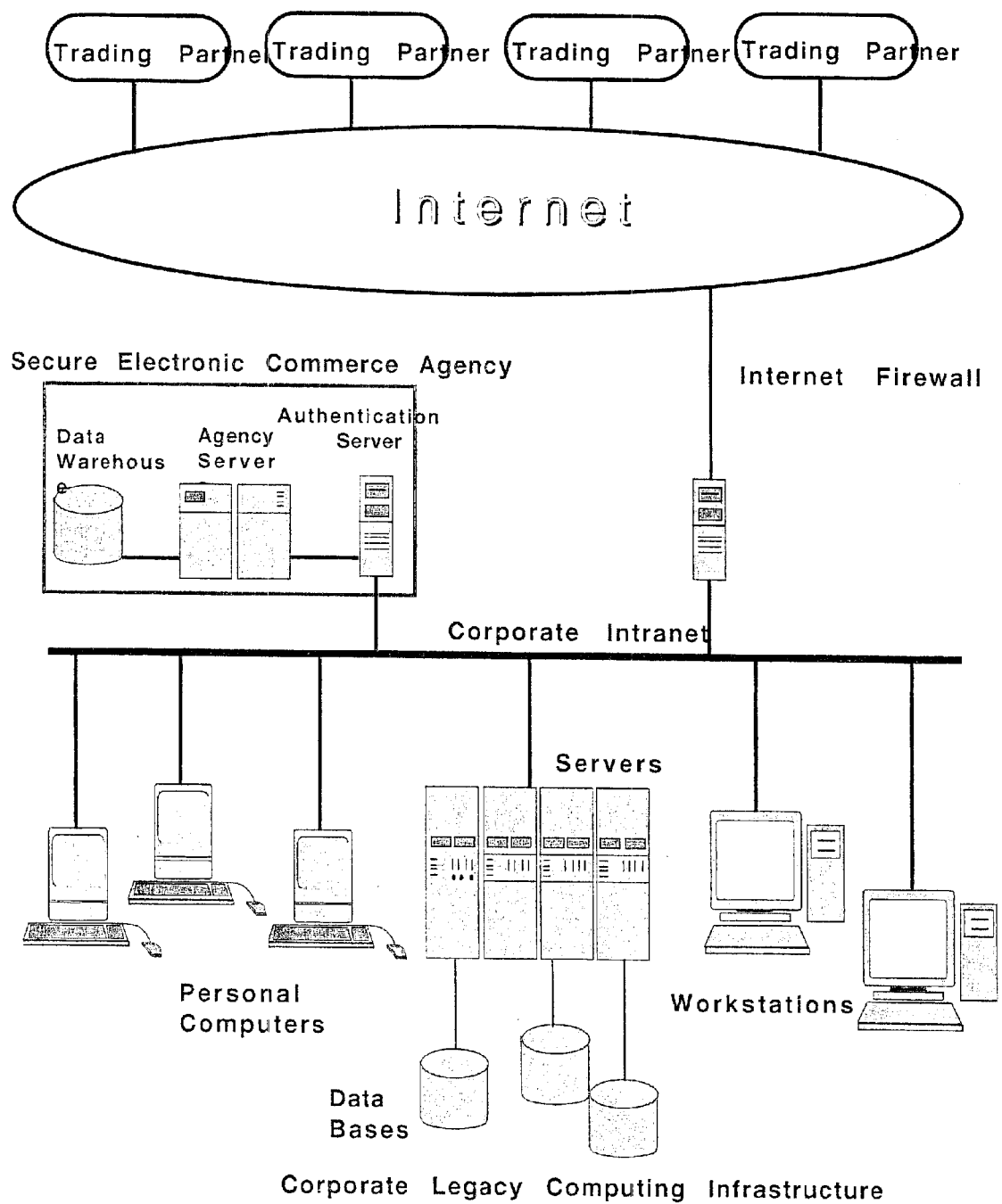
FIG. 12 is an illustration of connected computer resources suitable for use in the present invention.

The present invention is based on three general concepts: (1) creation of a distributed object programming environment with an underlying secure network infrastructure; (2) a distributed object representation of a shipping transaction; and (3) insertion of knowledgeable software agents at critical points in the information flow. Since the stakeholders in the border shipping domain can be geographically distributed independent organizations, the Internet provides a ready-made communications infrastructure to integrate their operations. Using the open Internet as the communications infrastructure accommodates any commercial organization with access. Security can be provided by public-key encryption and authentication techniques. The Internet, with its diversity and ubiquity, can be well suited for use with the present invention if security issues are addressed. The present invention, using the Internet, can allow conduct of international commerce from any site with an Internet connection and a web browser. The Web, nearly as far-flung as the Internet itself, also suggests HTML as the lingua franca of the present invention, thus obviating the user interface dilemma and neatly solving the client end of the system. In the present invention, a highly specialized agent can convert HTML from the client into the central ontology and back. FIG. 12 is an illustration of connected computer resources suitable for use in the present invention.

Figure 14:
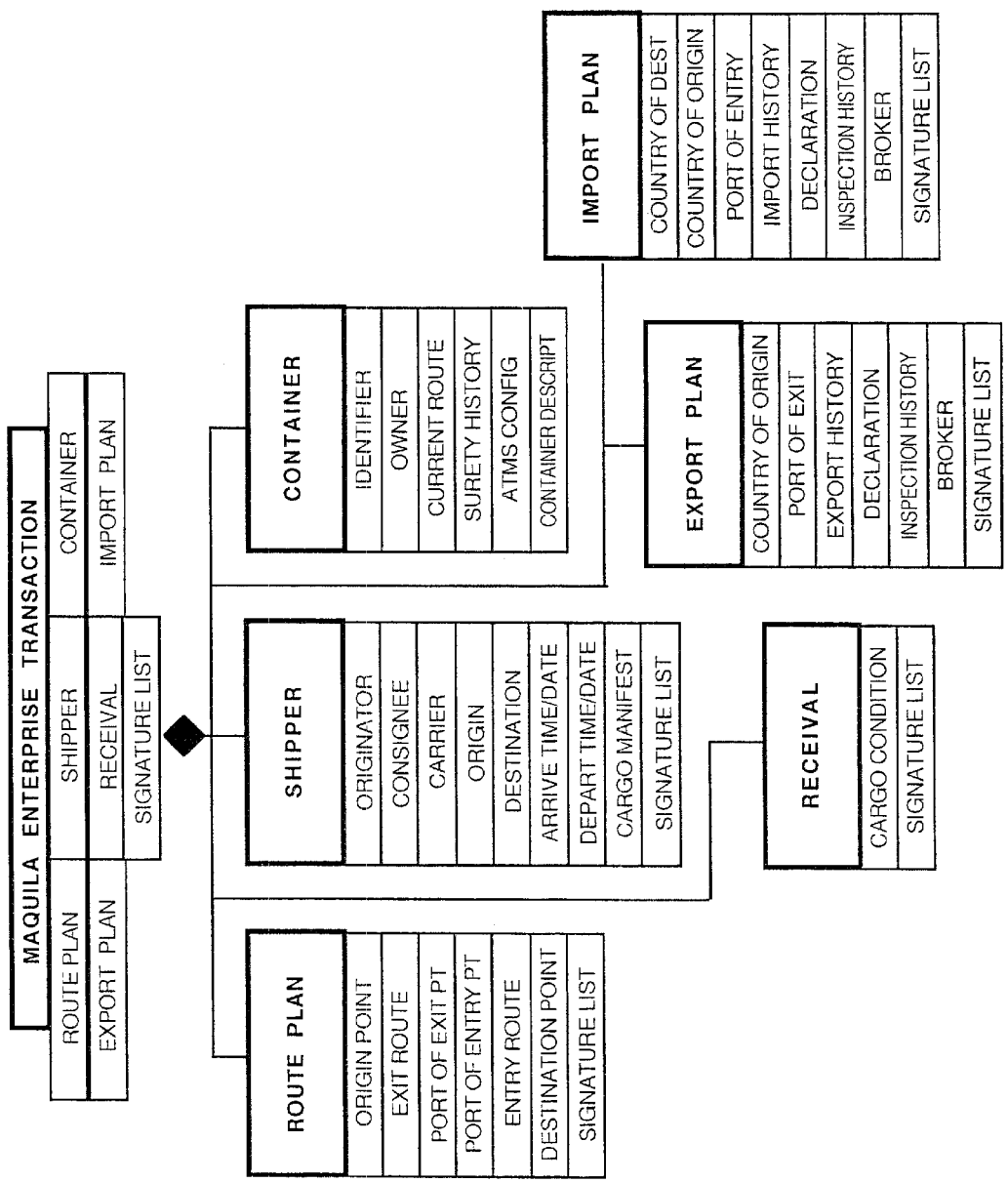
Figure 15:
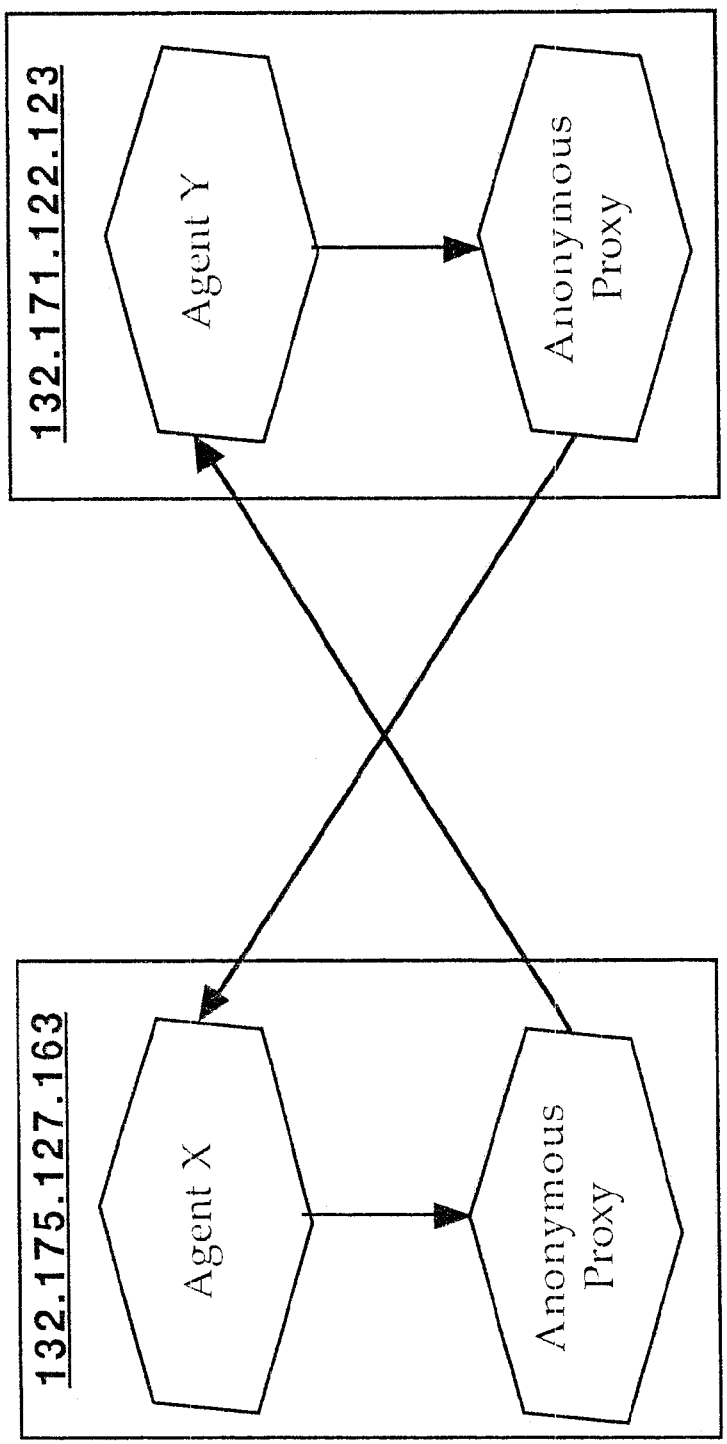
FIGS. 15–20 are illustrations of agent deliberation mechanisms and communications functions.
Figure 16:
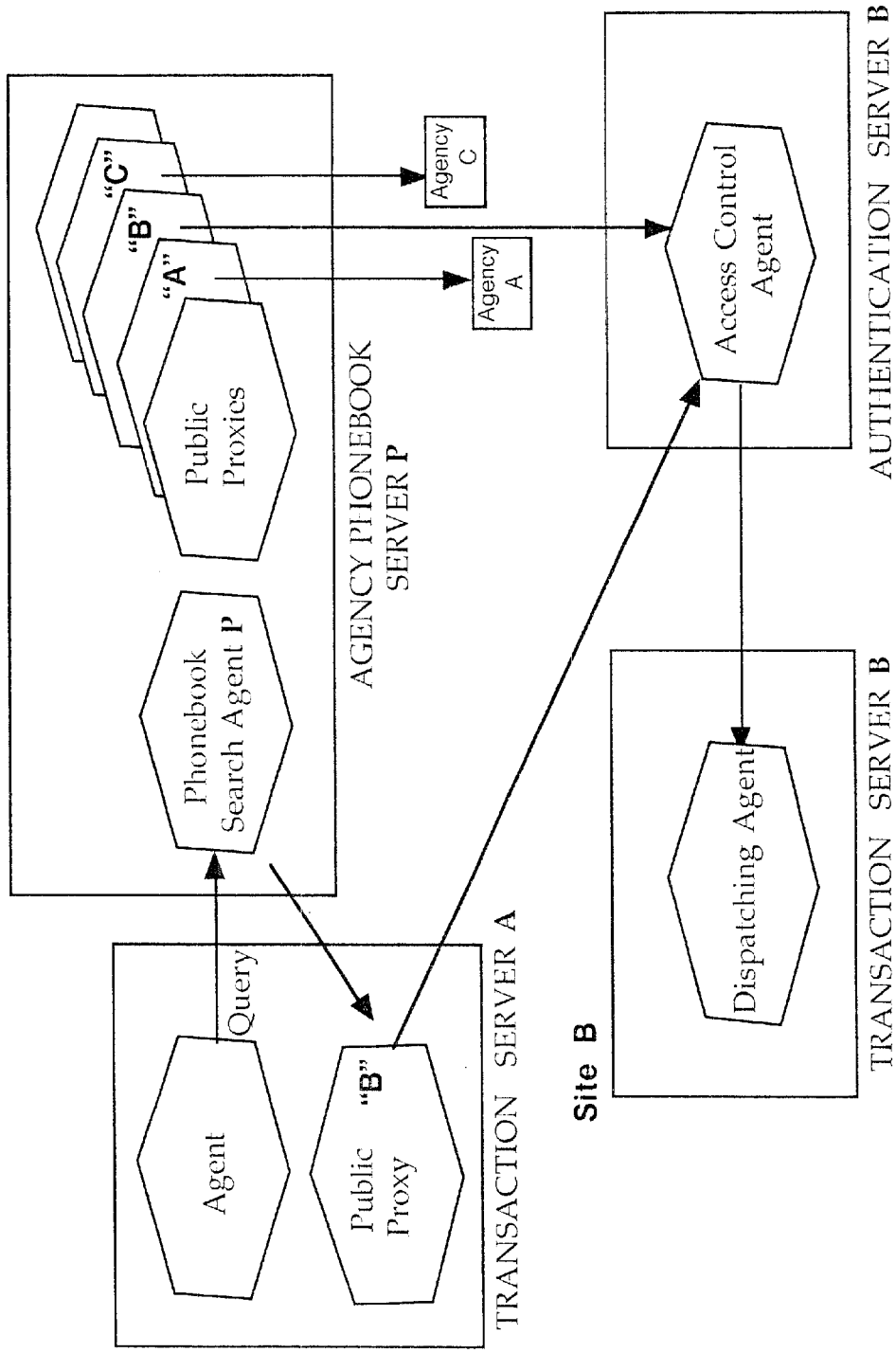
Figure 17:
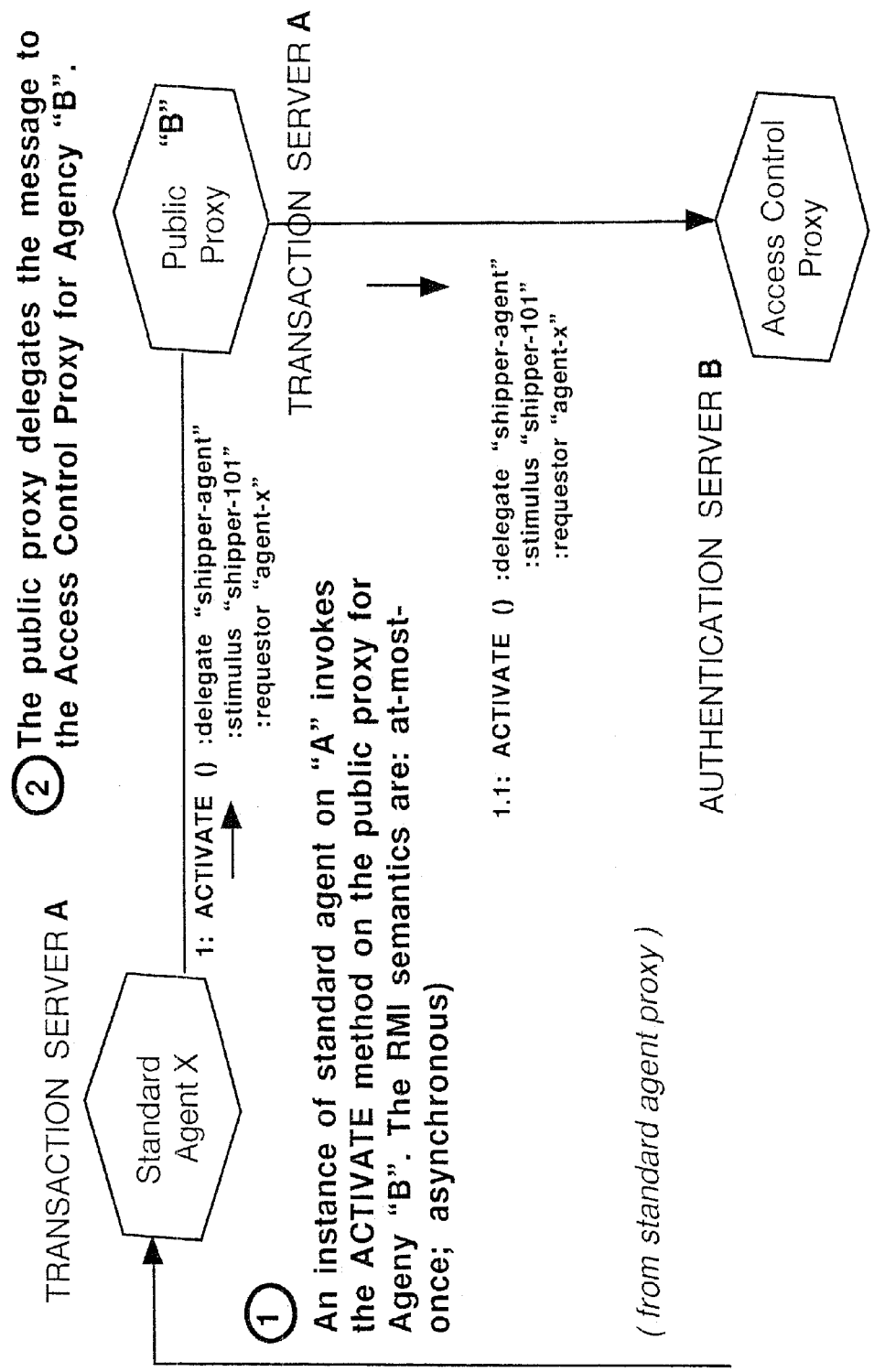
Figure 18:
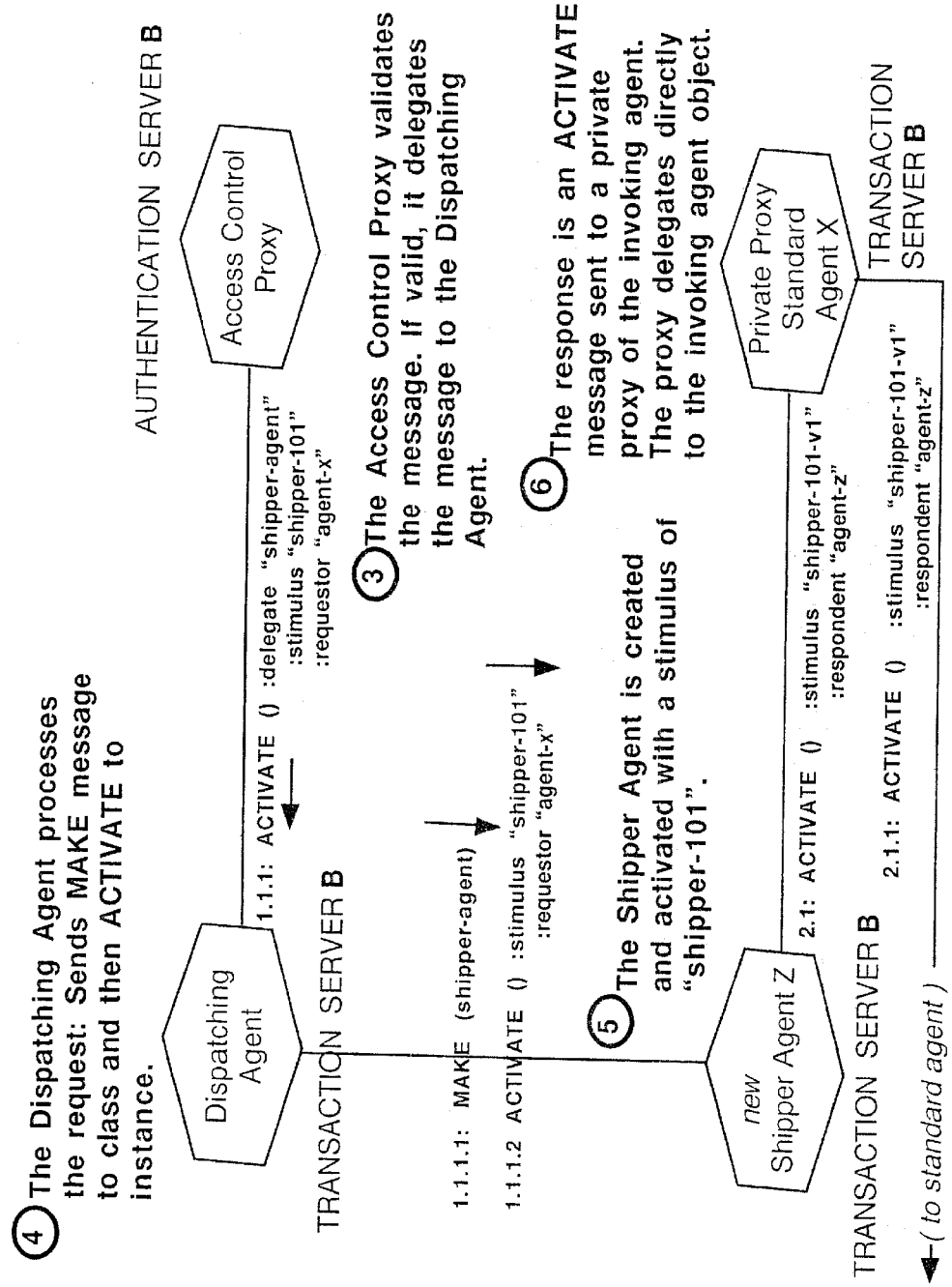
Figure 19:
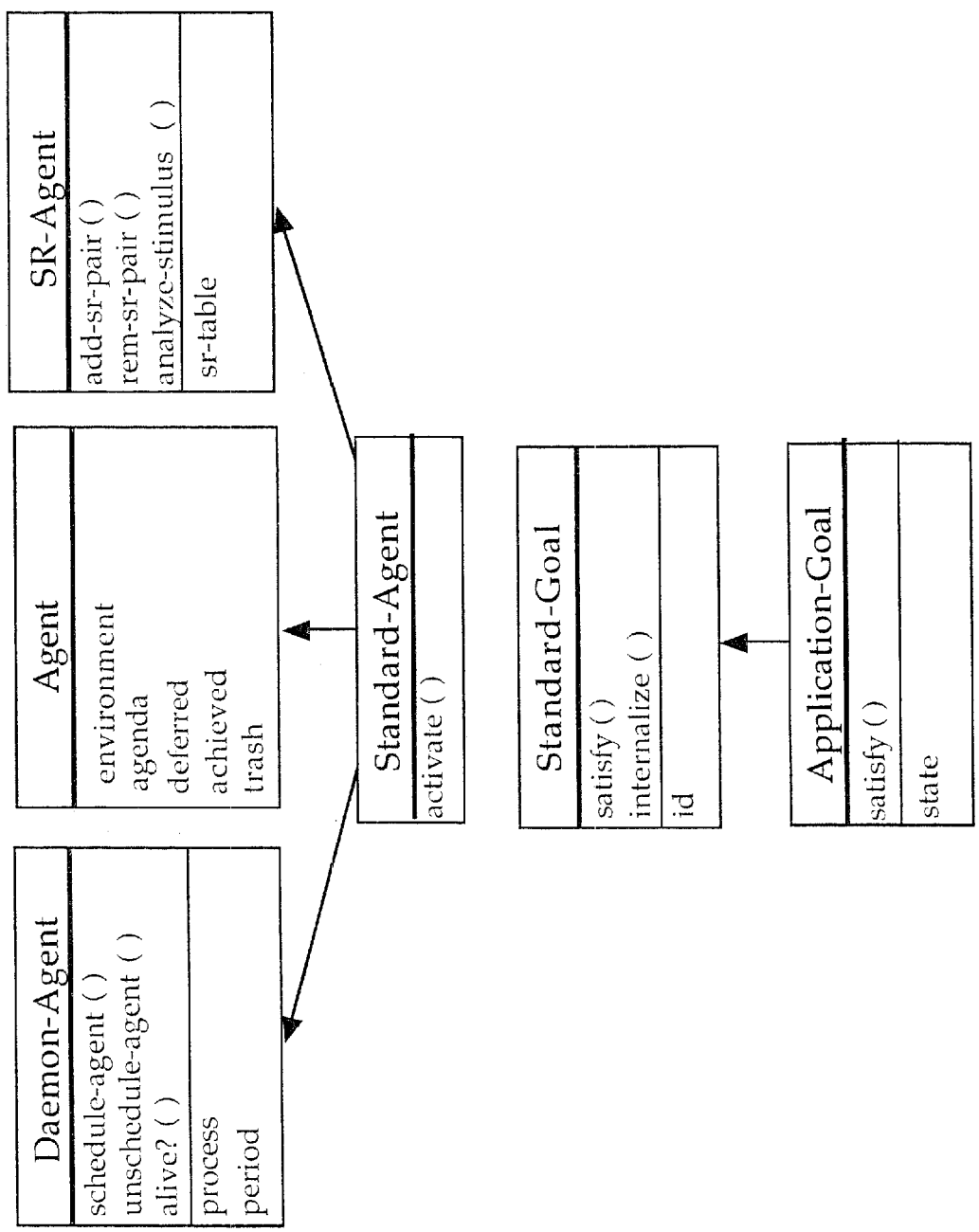
Figure 20:
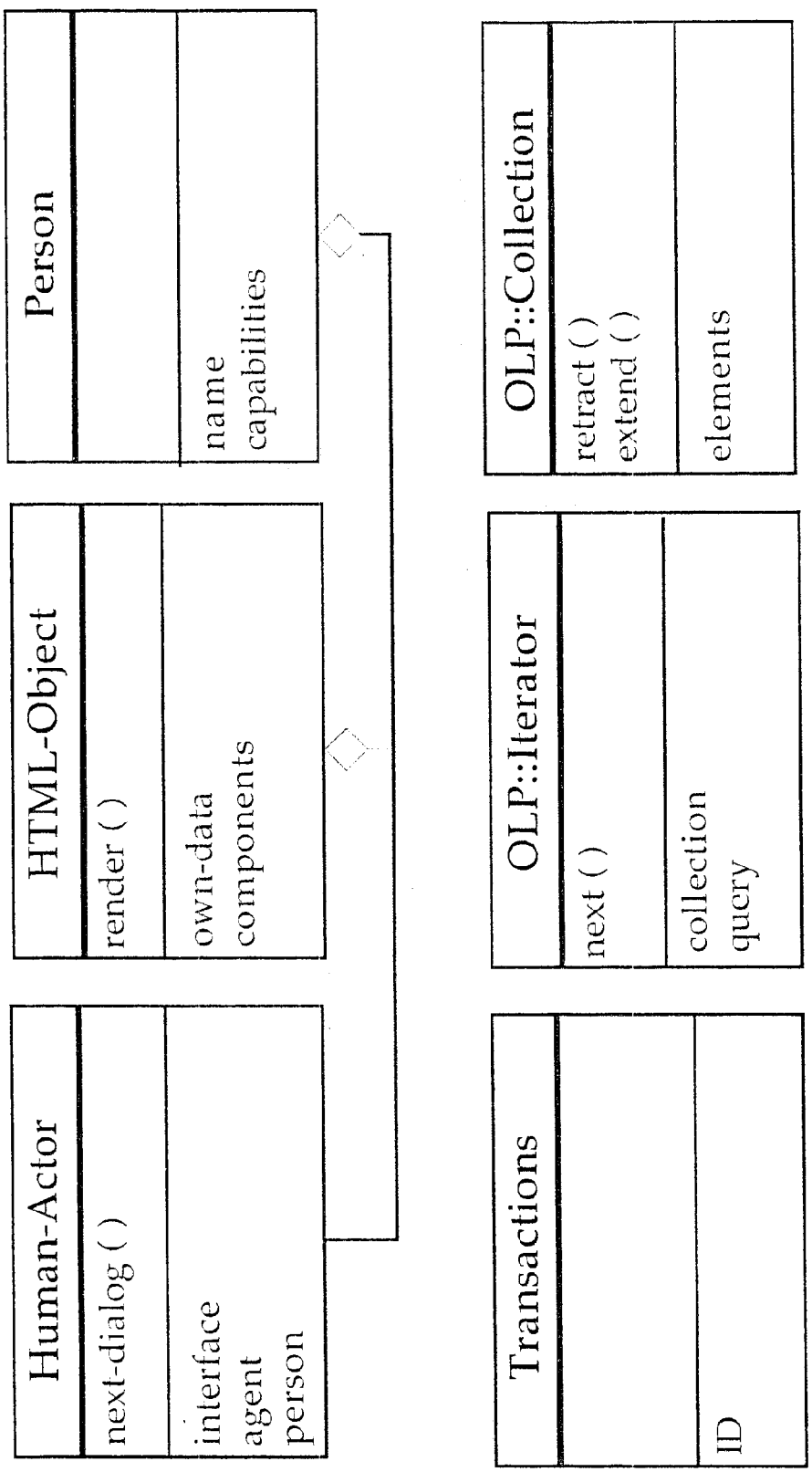
Figure 21:
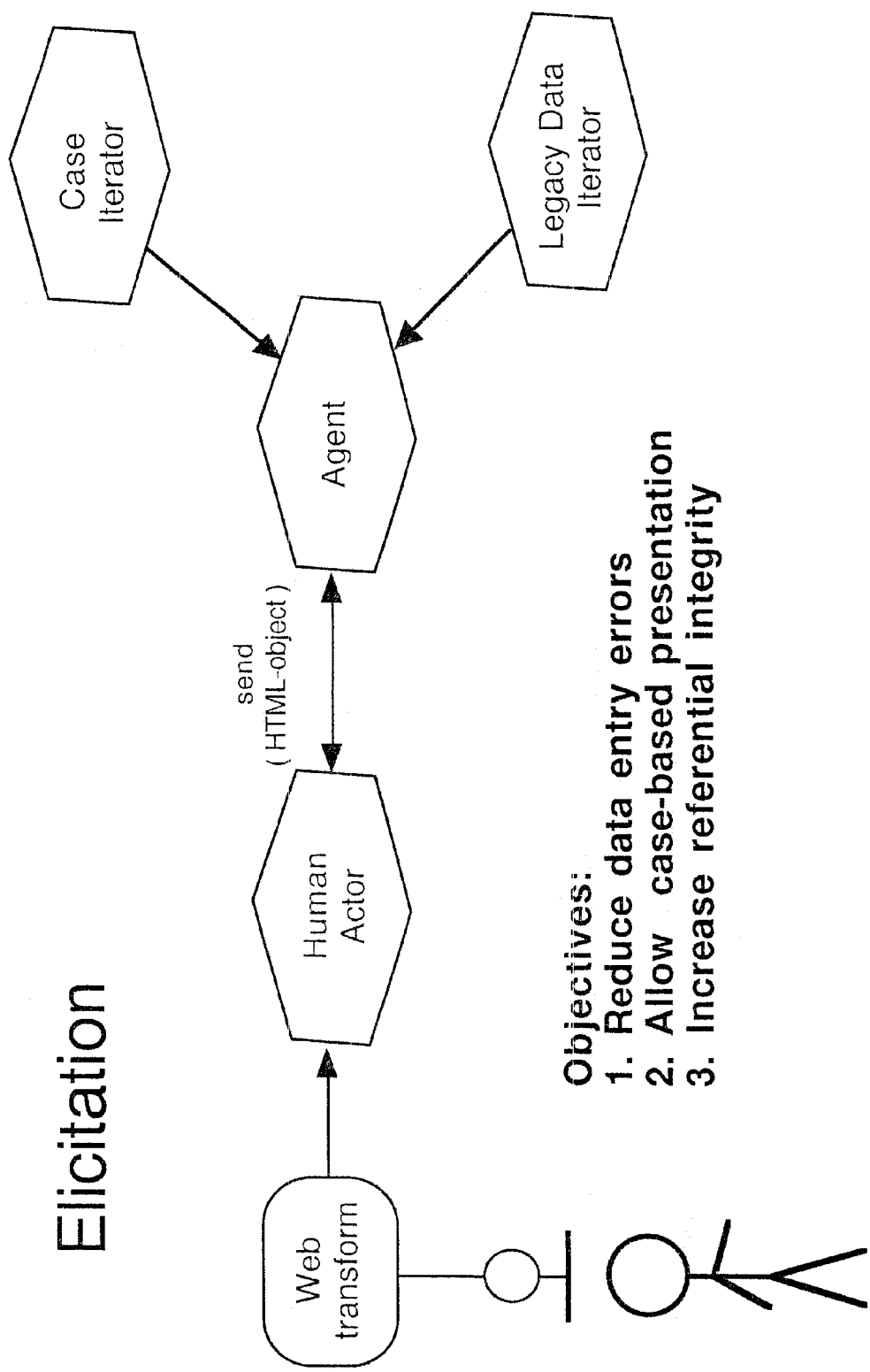
FIGS. 21–25 are illustrations of elicitation, mediation, delegation, negotiation, and monitoring tasks of agents.
Figure 22:
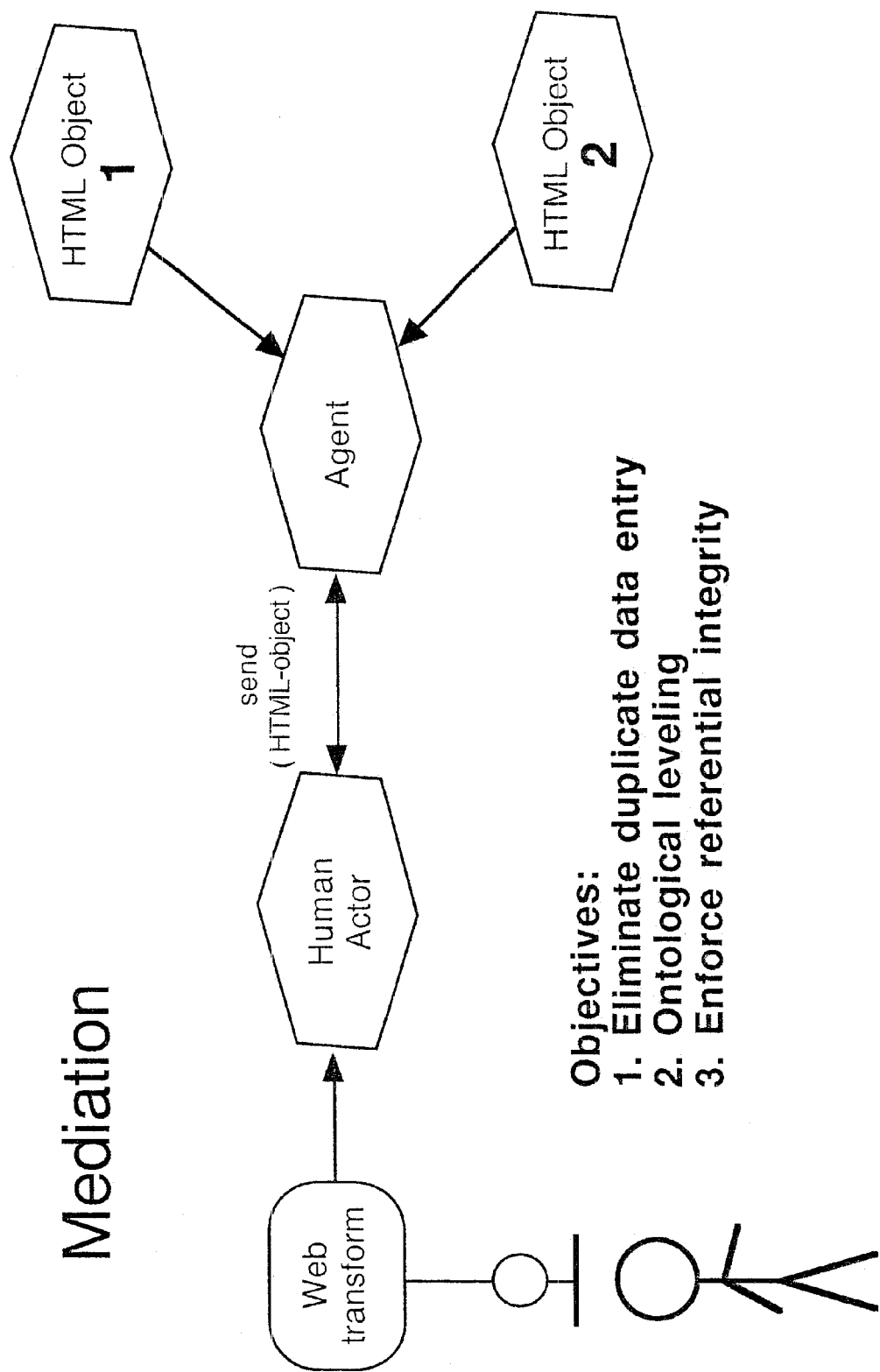
Figure 23:
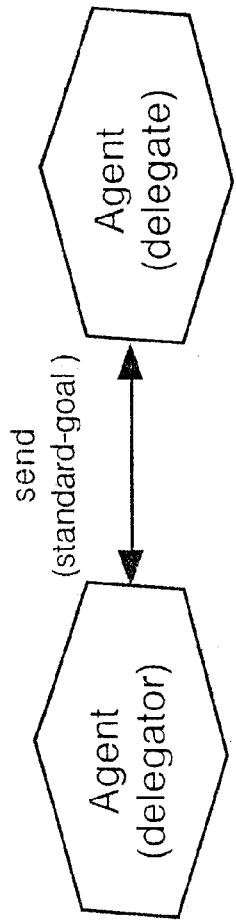
Figure 24:
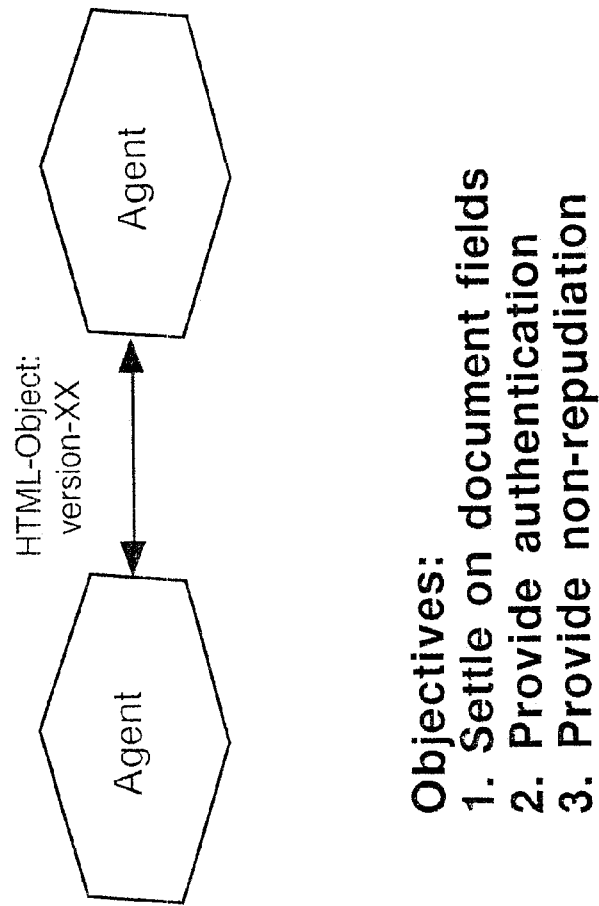
Figure 25:
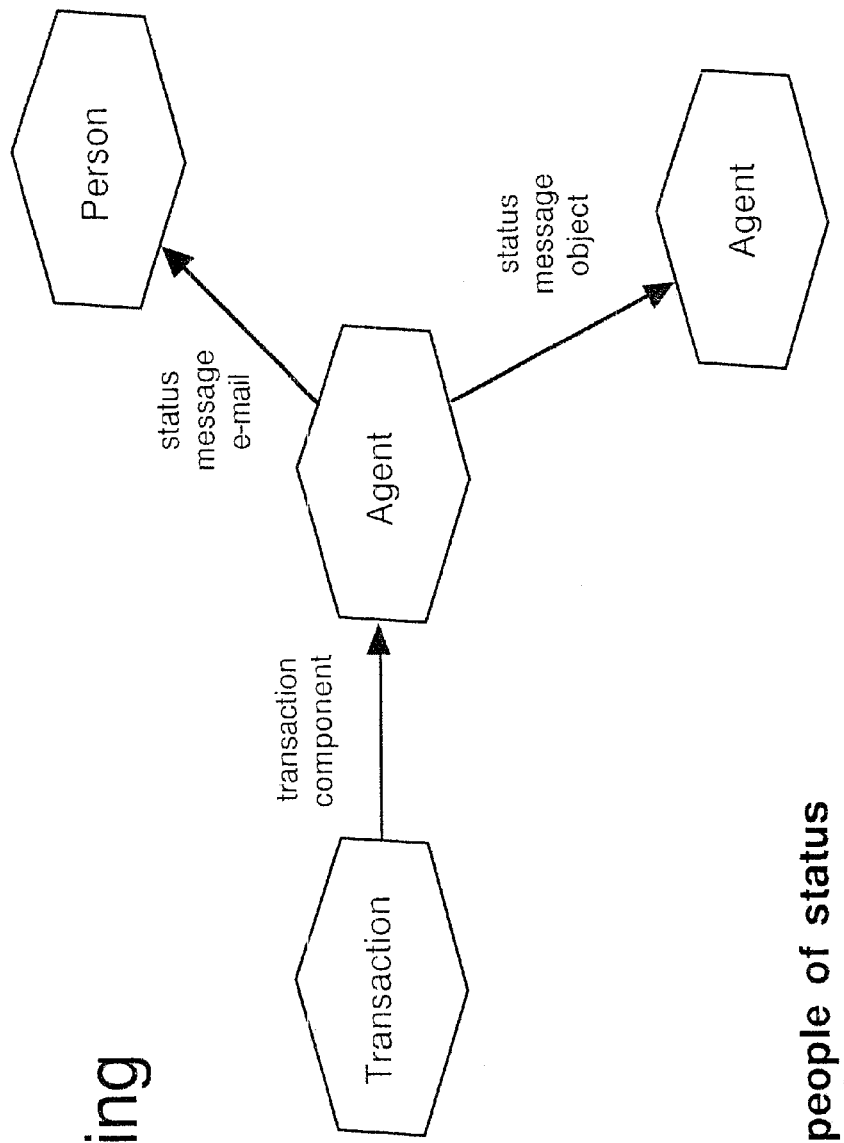

Overlying the secure Internet is a distributed object programming system that provides a seamless design methodology for networked object environments, such as that described in Spires, "The DCLOS Distributed Object System", SNL AISL Technical Report, incorporated herein by reference. The distributed object system facilitates networking agents in a collaborative environment. Distributed object technology also can support a shared fragmented workpiece object, i.e., a virtual object having a unique identity, represented by many components residing on different nodes in a network. The information needed to effect a single shipment can be captured in a complex distributed information structure with compositional semantics called the Maquila Enterprise Transaction (MET), illustrated in FIGS. 13 and 14. The components of a given MET can be distributed among the agencies involved in a particular shipment. The MET can be shared via proxy; when a given agent needs information in the MET, it can be handed the proxy to the MET. Since the MET can be distributed, no one agent or agency has access to all components. Access can be permitted based on task requirements and controlled by electronic signature. Agents can interact with the border-crossing process by collecting and organizing information and posting it in the MET. Control of the distributed computation can be decentralized and opportunistic. Each agent can compute new information components based on its internal knowledge base and the state of the MET. Changes in the components trigger computations by agents in a decentralized manner. Suitable agent deliberation mechanism and communications functions are illustrated in FIGS. 15–20.

Agents can improve the border crossing process in the following manner:

1. Document quality can be improved by elicitation agents. Elicitation agents can interface with human informants and specialists to elicit highly structured forms-based data, ensuring that proper documents are entered into the system. Elicitation agents can have significant knowledge about the domain and the forms, and they are able to present partially-instantiated documents through use of a case-based reasoning mechanism. Elicitation can include mediation of information from other documents to remove the opportunity for redundant data entry. Invariant data from previously completed documents, having been validated by other elicitation agents and not the responsibility of the current human informant, is translated into the target document's ontology and copied into a non-editable field of the target document.

2. Timeliness of documentation and integration of shipment information can be improved by an agent collective comprising agents from different organizations that can monitor status and coordinate work flow. The collective can correlate the physical state of the shipment with its information state to maintain registration and reference, can mediate the agency's work on the transaction, can update the transaction, can notify collaborators of updates, and can enforce selective data sharing. Monitoring can be accomplished by each agent independently and focuses on the interests of its parent organization. Agents can respond to requests for status information by users.

3. An open decentralized trading regime can be ensured by negotiation agents. Negotiation agents can be the points of contact for each trading organization. They can inspect each incoming transaction before committing to accept the transaction, first validating customer and supplier relationships, and analyzing the ability of the organization to perform the requested services. Upon accepting a transaction, negotiation agents can dispatch potential transactions to agents representing knowledge workers for further processing.

Agents can be allocated to several generic tasks: elicitation, mediation delegation, negotiation, and monitoring, illustrated in FIGS. 21–25.

Figure 26:
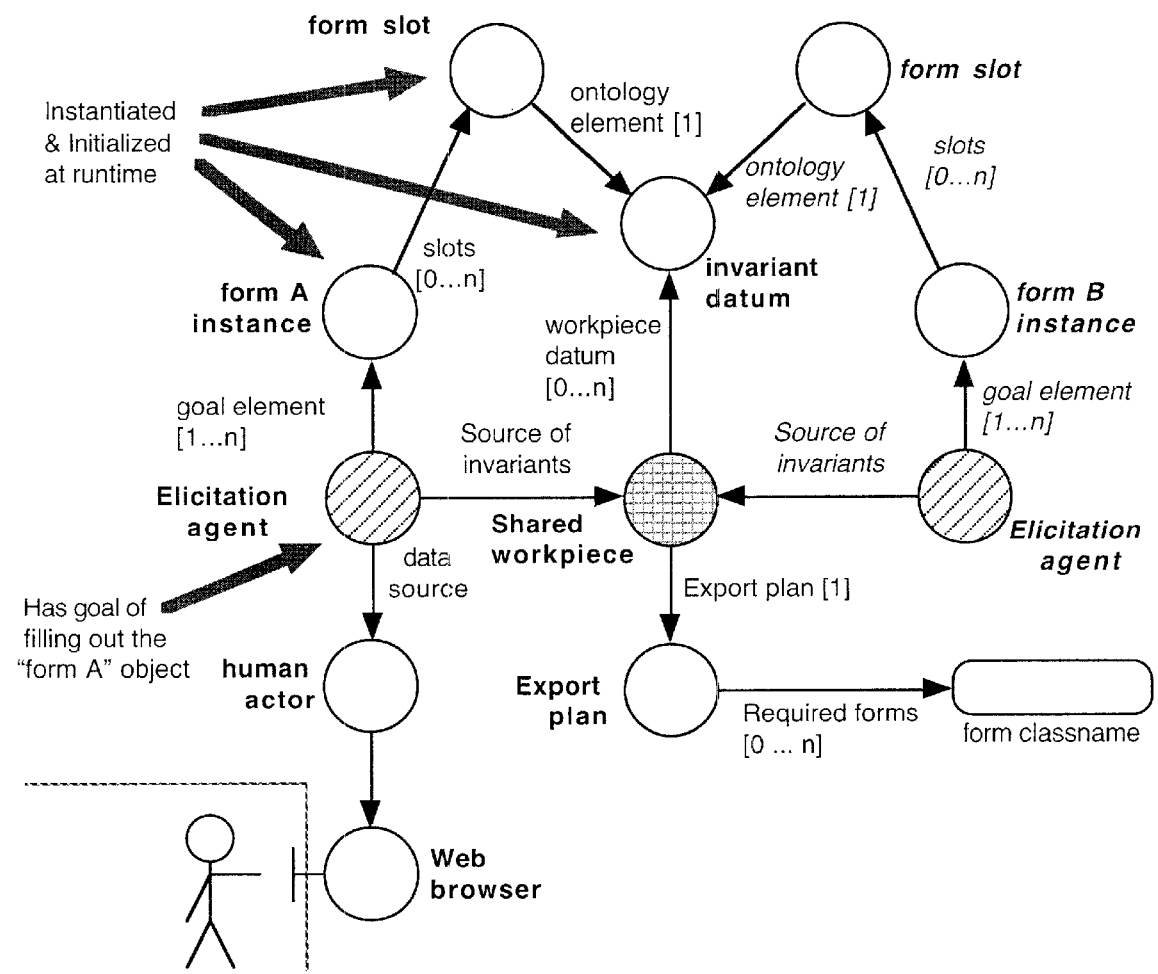
FIG. 26 is a schematic representation of elicitation and mediation.
Figure 28:
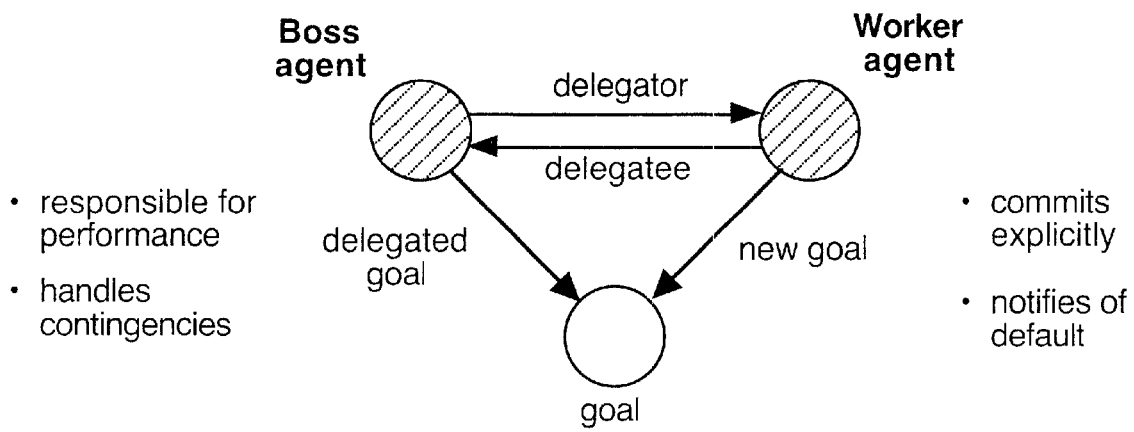
FIG. 28 is a schematic representation delegation.

FIGS. 26, 27, and 28 show elicitation, delegation, and negotiation in use case notation, described in Jacobson, "Object-Oriented Software Engineering", ACM Press (1992). In the figures, the agents are distinguished as spherical. Elicitation and mediation can be performed within the same context by an elicitation agent. FIG. 26 shows an Elicitation Agent working with form A instance connected by its inherent slot structure to the shared workpiece (this is the MET discussed above). The Export plan requires that a form of the type named as one of the "Required forms [0 . . . n]" be properly filled out. The agent interacts with the Human actor object, an internal representation of the individual, which in turn communicates with the person via the Web browser. Another Elicitation agent (the italicized links) that needs access to the same information gets it from the shared workpiece, which is the transaction record.

Negotiation and delegation behaviors can provide coordination of the workflow and timely completion of all documents. Agents can coordinate their activities through direct communications and explicit cooperative control, such as described in Lesser, "A Retrospective View of FA/C Distributed Problem Solving", IEEE Transactions on Systems, Man, and Cybernetics 21 (6): 1347–1362 (1991). Customer agents can negotiate task specifications with supplier agents. When a contract is negotiated and the supplier agent commits to perform the services, the customer agent can delegate the task to the supplier. Throughout the negotiations, each proposed new version of the task can be signed by the proposing agent with a cryptographic digital signature as shown in FIG. 27. Agent "A" can sign with the signature denoted "A;" agent "B" can sign with signature "B." The final contract can be signed by both agents. The basis of coordinated negotiation and delegation is very similar to a joint intentions protocol known to those skilled in the art. See, e.g., Jennings, "Specification and Implementation of a Belief-Desire Joint Intention Architecture for Collaborative Problem Solving; Tambe, "Towards Flexible Teamwork", Journal Artificial Intelligence Research 7, 83–124 (1997).

The shared workpiece object called a transaction can be viewed as a reified (made actual in the form of a first class object) Joint Persistent Goal object that provides the shared intention within stakeholder agent team to complete a shipment transaction. Although the agents involved in the transaction belong to independent organizations, we assume that they are cooperative. Actual negotiation of terms and conditions of commerce can be conducted by human actors offline in the form of preferred supplier contracts and on-line with agents assisting with the documentation. Specific agent negotiation protocols are not needed because most contract terms have been agreed to before hand. Agents can attempt to perform simple constraint satisfaction on some mild problems such as supplier selection and delivery time, but in general need not be involved in negotiations as self-interested agents. Public-key digital signatures can be added to negotiated forms and tasks for accountability and non-repudiability, important for many commercial trading applications.

Delegation is shown schematically in FIG. 28. A goal or task is passed from a "boss agent," who retains responsibility for the goal, to a "worker agent," who must commit to achieve the goal or report defaulting. If the delegate defaults, the delegator is responsible for finding another qualified delegate.

Implementation of Agents

Figure 29:
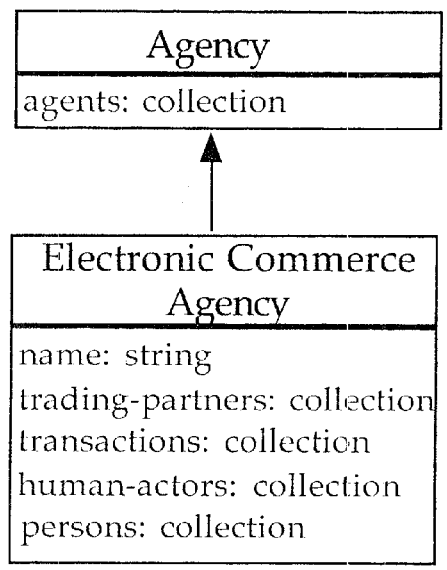
FIG. 29 is a schematic representation of agent populations organized into agencies.

Agent populations can be organized into agencies, collectives of agents of various competencies, that have ongoing high-level goals stated in business terms, as shown in FIG. 29. The present invention comprises a distributed set of agencies specialized on the commercial functions of the various stakeholders in the border-crossing process.

The agents can be realized as instances of speciated agent classes whose behavioral envelope is defined by the an agent framework. The agent framework can be an object-oriented framework that enables the exploratory development of multi-agent systems that interact with human users. The agent framework can provide a means for constructing and customizing multi-agent systems by specialization of base classes (architecture-driven) and by composition (data-driven).

The framework can comprise two associated abstract classes: agent and agency. An agency identifies an independent locus of processes, activities, and knowledge typically associated with a company, organization, department, site, household, machine, or some other natural partitioning of the application domain. The underlying assumption is that the application can be naturally modeled as a group of interacting agencies. The agency provides a containing context for a collection of agents. The activities of the agency are conducted by its constituent agents. Agents inhabit an agency for the express purpose of providing services, including interagency communications, that maintain the functioning of the agency and lead to satisfaction of the ultimate objectives of the agency. An agent performs domain-specific tasks on behalf of human actors and other agents.

Actual agent systems can be implemented by the specialization and instantiation of four concrete classes: (1) Standard Agency; (2) Standard Agent; (3) Human Actor; and (4) Resources. The class Standard Agency is an elaboration of the agency concept that includes human activities within the agency and devices for data-oriented activities such as storage and communications. An instance of Standard Agency is a persistent, identity-bearing composite object that contains collections of the component classes Standard Agent, Human Actor, and Resources. The class Standard Agent implements instances of agents that have specific attributes: autonomy, social ability, reflexivity, and pro-activeness, as described in Wooldridge and Jennings, "Intelligent Agents: Theory and Practice", Knowledge Engineering Review 10(2) (1995). The primary Standard Agent protocols can be an interface mechanism that enables interaction with other agents and human actors, a reflexive action mechanism for rapidly responding to event objects in the agent's environment, and a generic inference mechanism for achieving explicit goals. The interaction and inference protocols can be specialized with methods that implement other agent architectures and mechanisms. Agents can be self-contained threads of execution that execute both periodically and through immediate scheduling.

The concrete component class Standard Goal can implement a general achievement goal. An agents agenda contains descendants of Standard Goal that define the agent's motivations. Standard Goal may also be subclassed and its protocols specialized to implement modular knowledge to achieve well-known classes of goals. Mixin (abstract classes that are components of a concrete class) goal behaviors can define reusable canonical goal behaviors useful in many applications. For example, conducting an interactive session with a human informant has many common aspects that are independent of the domain or subject. These common aspects are captured in the mixin elicitation-goal that abstracts away from the subject goal design things such as user timeout handling, stream and 1/0 management, and human-agent synchronization. As another example, a specialized concrete subclass of standard goal can implement a Joint Persistent Goal (JPG) in the design pattern supporting collaboration through joint intentions. The joint intentions pattern supports extensions for team formation as well, as described in Tambe, "Towards Flexible Teamwork", Journal of Artificial Intelligence Research 7, 83–124 (1997).

Human Actors are people that inhabit the agency through an interface device and interact with agents to accomplish tasks. Human actor objects are temporary objects that contain an interface address, an interface object that captures the display, data entry and control functions currently available to the person, and a persistent person object that holds personal data, passwords, email address, and an account object that provides access to past and current workspaces. A workspace object contains objects created and stored by the person during work sessions.

Agents and human actors can have access to resources such as databases, fax machines, telephones, email handlers, and other useful services. Resource objects can provide concurrency control and access protocols for agency resources. Subclasses of the resource class can implement objects representing databases, fax machines, printers, email ports, EDI ports and other commonplace legacy devices in the agency environment.

The Standard Agent Framework supports distributed agent systems. Agency objects can be distributed in a network environment to create a collaborative enterprise structure of interconnected agencies. A fundamental activity conducted among distributed agencies is the trading of domain objects through proxy agents that represent one agency within the agent collection of another agency. These proxy objects can delegate all messages (except for a local request for identifying information about the represented agency) to the appropriate domain or task agent residing in the agency. Public proxies can be registered in an agency network phonebook with a well-known address. To find other agencies, an agent can issue one or more queries to the phonebook and can be returned the proxy objects matching the query. The agent proxies interned within an agency form a persistent network of agencies. Such networks are called durable proxy networks.

An electronic commerce agency (ECA) is a specialized subclass of an agency that implements architectural features specific to electronic commerce applications. An ECA has the additional attributes of transactions and organizations. The transactions attribute holds a collection of open and closed transaction objects. The organizations attribute holds a collection of public proxy objects pointing to agencies that represent trading partners.

The agent society comprises several federated ECAs analogous to the interested business entities. Each ECA can be populated by a heterogeneous collective of speciated agents, each of which is able to perform a fragment of the information tasks needed to effect trans-border shipment. Their exact duties can be based on the idiosyncratic business rules of the actual businesses involved, so an operational ECA can be tailored and situated for each business. Constructing the ECA and the agents that make it up consists in specializing agents from a set of standard agent classes constructed for commerce. ECA classes can also be predefined for the various required roles: originator, receiver, transport provider, and import/export broker.

In addition to domain and task specialists, several varieties of housekeeping agents can perform maintenance tasks for the ECA. Security agents can control access by human actors to each agency within the parent organization. a human actor logged into the ECA "inhabits" the agency for the duration of the work session. An agent can handle all interactions with the human actor. Task agents can initiate requirements to obtain information based on activated goals, monitor the appropriate information sites to see whether the goals have been achieved, and take corrective or contingency measures when failures occur. Dispatch agents can allocate new transactions to the appropriate agents. Supervisory agents can allocate work to task agents, deal with rejected goals, collate agency-level data, and respond to outside requests for task status information. Various agents can incorporate reporting facilities for human actors, including government customs on both sides of the border.

Example Implementation

Figure 30A:
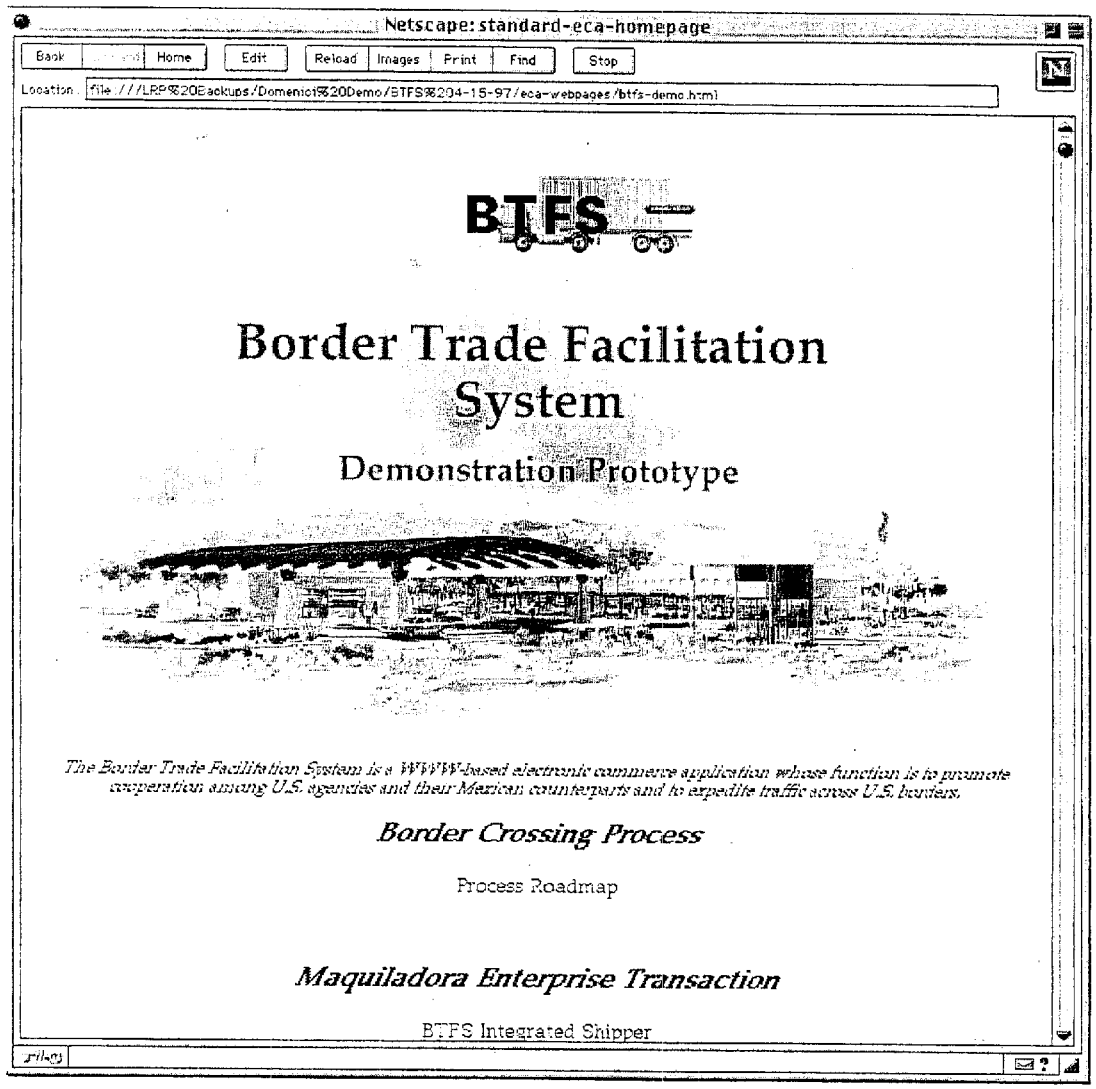
FIGS. 30(*a,b,c,d,e,f*) are example screens illustrating use of the present invention.
Figures 30B, 30C:
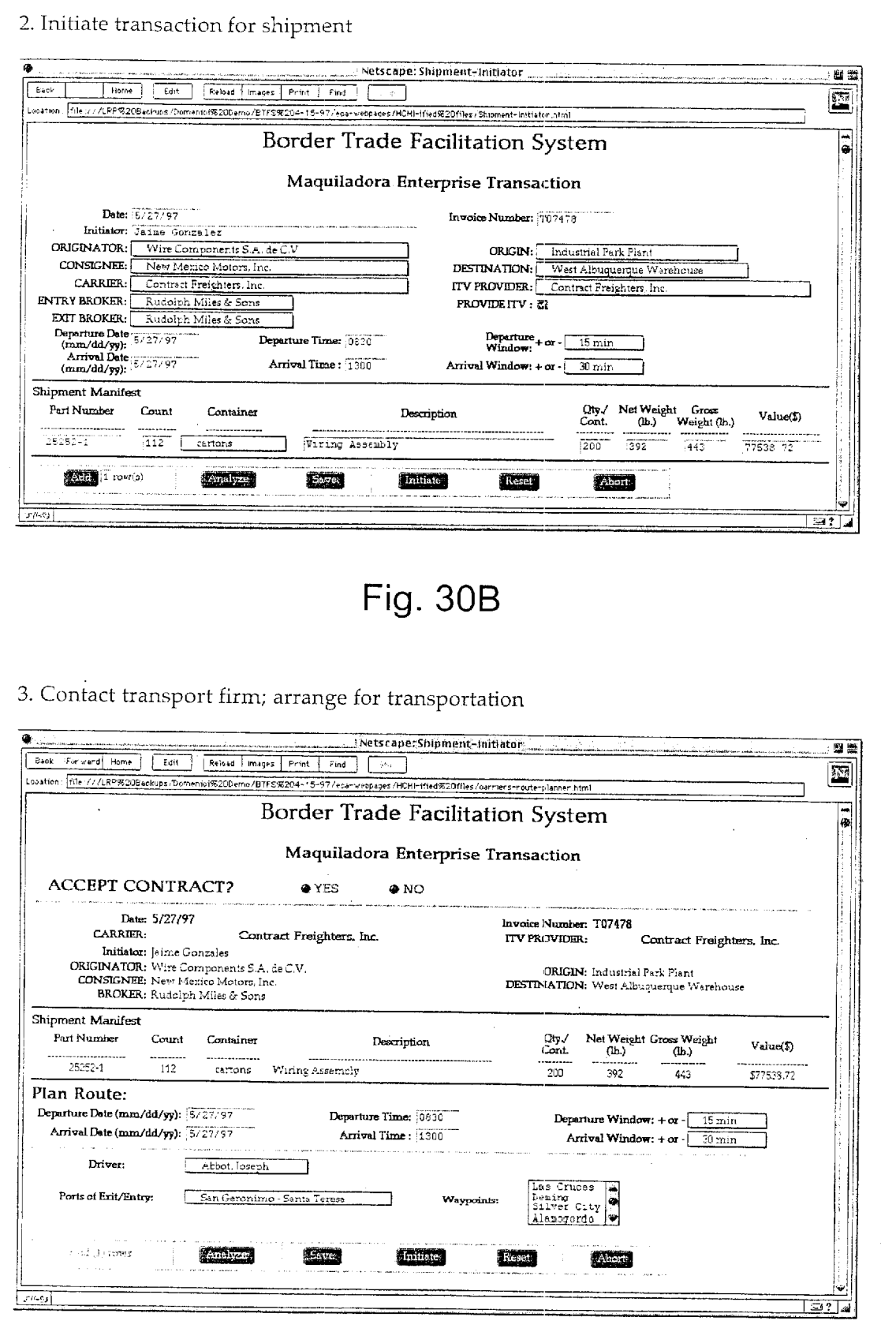
Figure 30D:
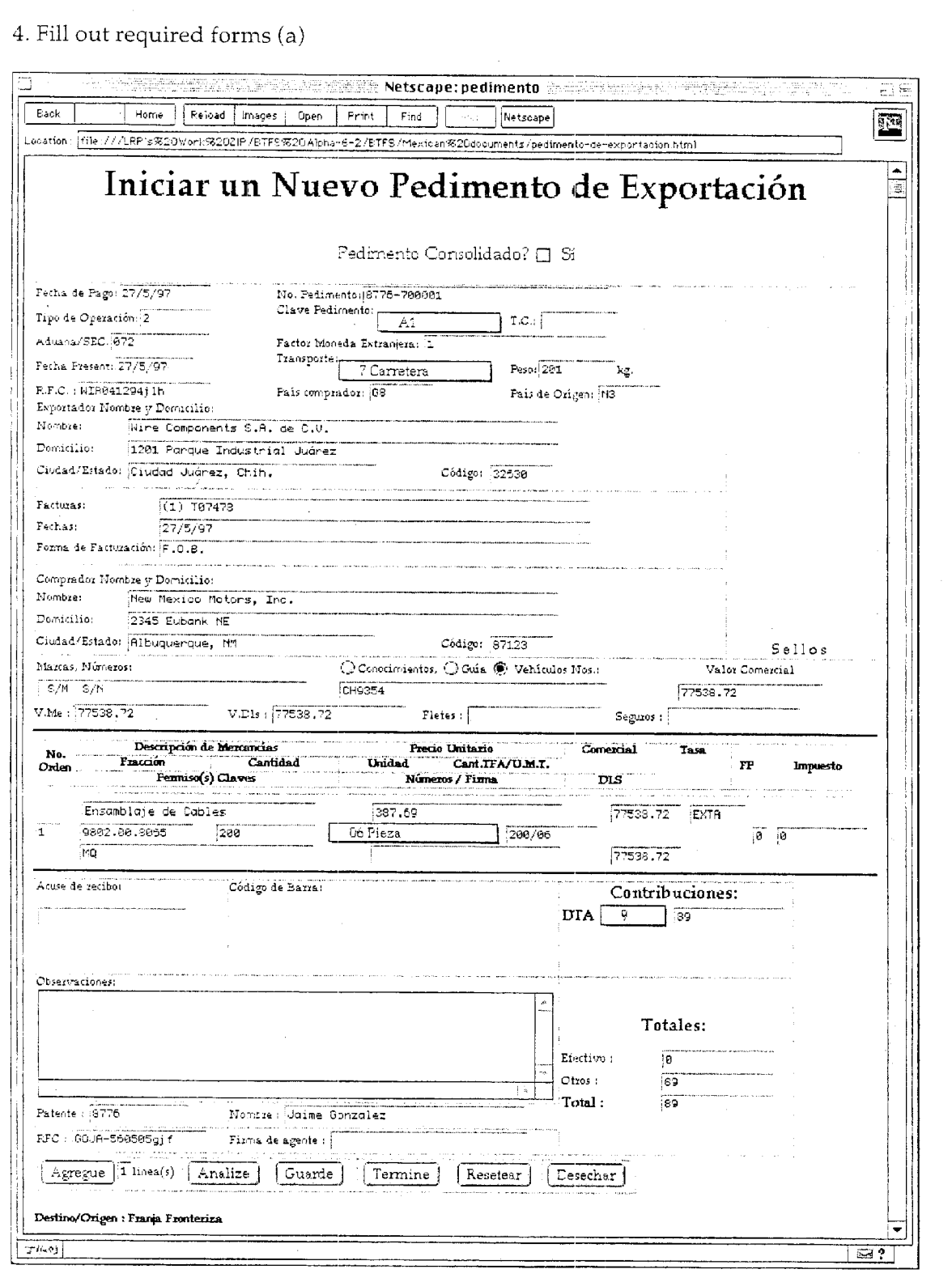
Figure 30E:
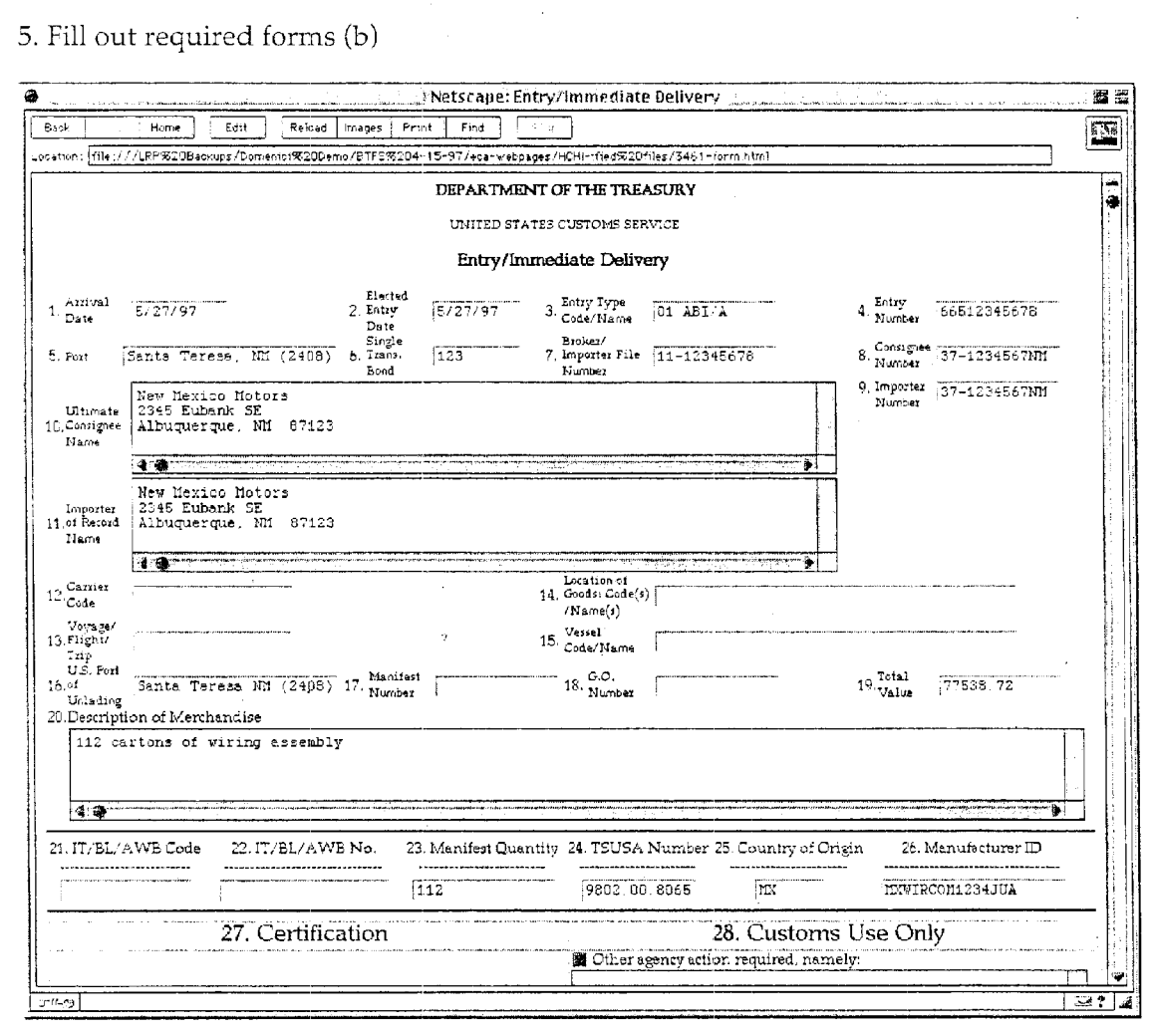
Figure 30F:
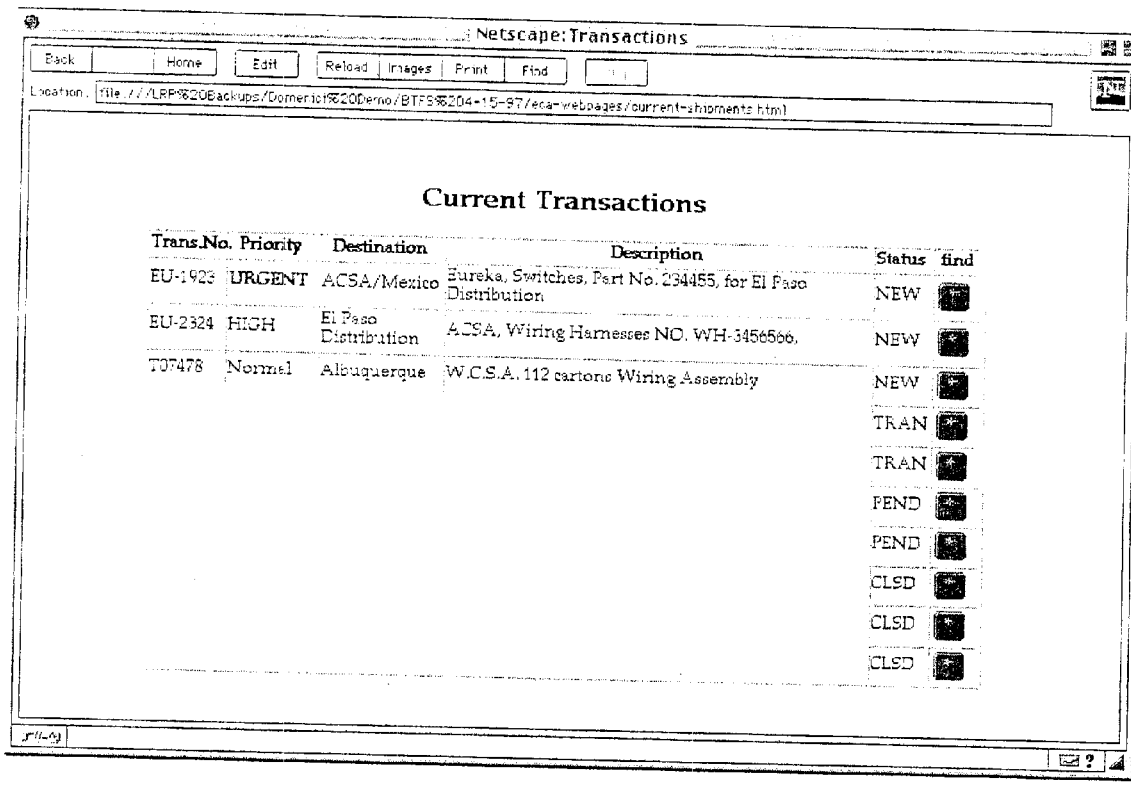

FIGS. 30(*a,b,c,d,e,f*) show an example transaction according to the present invention. FIG. 30*a* shows an example opening screen for signing on. FIG. 30*b* shows an example screen suitable for initiating a transaction for shipment. FIG. 30*c* shows an example form for contacting a transport firm and arranging for transportation. FIG. 30 shows an example form that might be required for shipping. FIG. 30*e* shows an example form that might be required for shipping. FIG. 30*f* shows an example form for initiating verified transactions and inspecting open transactions.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. An apparatus for managing transactions, wherein each transaction comprises information related thereto and changes in at least one of the location, status, and integrity of a physical component; comprising:
   a) a plurality of computers;
   b) a network connecting the computers;
   c) a system of cooperating software agents controlling the operation of the plurality of computers, comprising:
      i) input software adapted to elicit correct and consistent information from humans;
      ii) negotiation software adapted to communicate transaction information with other agent software; and
      iii) ontological software adapted to ontologically level disparate information related to a transaction;
   d) a security mechanism adapted to allow communication among the agents across the network, discourage interception of said communication by unauthorized agents, and reliably identify the originator of said communication;
   e) an object distribution mechanism adapted to distribute the cooperating agents such that the services of one agent can be invoked by another agent; and
   f) a physical sensor system, located in close proximity to the physical component, adapted to track information related thereto and changes in at least one of the location, status, and integrity of a physical component and communicate the tracked information to an agent.

2. The apparatus of claim 1, wherein the network comprises the internet.

3. The apparatus of claim 1, wherein the ontological software comprises software adapted to translate between two human languages.

4. The apparatus of claim 1, wherein the object distribution mechanism comprises at least one of: copying, proxying, and replication with automatic updating of replicant instances.

5. The apparatus of claim 1, wherein the physical component comprises goods to be shipped from an origin to a destination.

6. The apparatus of claim 1, wherein the physical component comprises goods to be shipped from an origin in a first nation to a destination in a second nation distinct from the first nation.

7. A method for using a plurality of connected computers to manage a transaction, wherein each transaction comprises information related thereto and changes in at least one of the location, status, and integrity of a physical component, comprising:
   a) providing a system of cooperating software agents that control the operation of the plurality of connected computers, each agent adhering to coordination protocols that allow agents to invoke services of other agents and to communicate information with other agents, the system comprising:
      i) input software adapted to elicit correct and consistent information from humans;
      ii) negotiation software adapted to communicate transaction information with other agent software;
      iii) ontological software adapted to ontologically level disparate information related to a transaction;
   b) providing a security mechanism adapted to allow communication among the agents across the network, discourage interception of said communication by unauthorized agents, and reliably identify the originator of said communication;
   c) providing an object distribution mechanism adapted to distribute the cooperating agents such that the services of one agent can be invoked by another agent;
   d) eliciting information initiating a transaction from a user;
   e) providing a physical sensor system, located in close proximity to the physical component, adapted to track information related thereto and changes in at least one of the location, status, and integrity of the physical component and communicate the tracked information to an agent;
   f) tracking information related thereto and changes in at least one of the location, status, and integrity of the physical component with the physical sensor system;
   g) communicating the tracked information to a software agent; and
   h) using the elicited information and tracked information to manage the system of cooperating software agents to elicit additional information related to completion of the transaction.

8. The apparatus of claim 1, wherein the physical sensor system comprises a Global Positioning System (GPS) unit for monitoring the location of the physical component.

9. The apparatus of claim 1, wherein the physical sensor system comprises a plurality of sensors adapted to communicate near-real-time event data and periodic state-of-health data to a Processing Unit adapted to transmit said data via a satellite communication link to a monitoring and tracking ground station.

10. The apparatus of claim 9, wherein each sensor comprises a RF wireless transmitter for communicating sensor data to a RF receiver operatively associated with the Processing Unit.

11. The apparatus of claim 10, wherein each sensor is battery-powered.

12. The apparatus of claim 1, wherein the physical sensor system comprises an environmental sensor selected from the group consisting of a smoke detector, a temperature detector, a humidity detector, a flame detector, a radiation detector, and a chemical detector.

13. The apparatus of claim 1, wherein the physical sensor system comprises an intrusion detection sensor selected from the group consisting of a microwave detector, an infrared detector, a balanced magnetic switch, and a wire grid detector.

14. The apparatus of claim 1, wherein the physical sensor system comprises an containment sensor selected from the group consisting of a motion sensor, an active fiberoptic seal, a load cell, and a load link.

15. The apparatus of claim 9, wherein the Processing Unit comprises means for time-tagging and immediately transmitting special event data via the satellite communication link to the monitoring and tracking ground station; wherein the special event is selected from the group consisting of the activation of a sensor; the tampering of a sensor; a missing state-of-health message, and a message that is not properly authenticated.

16. The apparatus of claim 1, wherein the physical sensor system comprises means for authenticating and encrypting sensor data generated by the physical sensor system.

17. The method of claim 7, further comprising monitoring the location of the physical component with a Global Positioning System (GPS) unit located close by the physical component.

18. The method of claim 7, wherein the physical sensor system comprises a plurality of sensors; and wherein the method further comprises communicating near-real-time event data and periodic state-of-health data from the plurality of sensors to a Processing Unit adapted to transmit said data via a satellite communication link to a monitoring and tracking ground station.

19. The method of claim 18, wherein the method further comprises transmitting sensor data via a RF signal to a RF receiver operatively associated with the Processing Unit.

20. The method of claim 19, wherein each sensor comprises a battery-powered, wireless RF transmitter.

21. The method of claim 7, wherein the physical sensor system comprises an environmental sensor selected from the group consisting of a smoke detector, a temperature detector, a humidity detector, a flame detector, a radiation detector, and a chemical detector.

22. The method of claim 7, wherein the physical sensor system comprises an intrusion detection sensor selected from the group consisting of a microwave detector, an infrared detector, a balanced magnetic switch, and a wire grid detector.

23. The method of claim 7, wherein the physical sensor system comprises an containment sensor selected from the group consisting of a motion sensor, an active fiberoptic seal, a load cell, and a load link.

24. The method of claim 18, further comprising time-tagging and immediately transmitting special event data via the satellite communication link to the monitoring and tracking ground station; wherein the special event is selected from the group consisting of the activation of a sensor; the tampering of a sensor; a missing state-of-health message, and a message that is not properly authenticated.

25. The method of claim 7, further comprising authenticating and encrypting sensor data generated by the physical sensor system.

\* \* \* \* \*